(12) United States Patent
Hamamoto et al.

(10) Patent No.: US 10,052,939 B2
(45) Date of Patent: Aug. 21, 2018

(54) VEHICLE AIR CONDITIONER

(71) Applicants: JAPAN CLIMATE SYSTEMS CORPORATION, Hiroshima (JP); Panasonic Corporation, Osaka (JP)

(72) Inventors: Hiroshi Hamamoto, Hiroshima (JP); Kohei Fukawatase, Hiroshima (JP); Yoshihiko Otake, Hiroshima (JP); Kou Komori, Nara (JP); Subaru Matsumoto, Tochigi (JP); Katsuyoshi Wakano, Tokyo (JP); Mio Furui, Osaka (JP); Norihiro Miyamura, Hyogo (JP)

(73) Assignees: JAPAN CLIMATE SYSTEMS CORPORATION, Hiroshima (JP); PANASONIC CORPORATION, Osaka (JP)

( * ) Notice: Subject to any disclaimer, the term of this patent is extended or adjusted under 35 U.S.C. 154(b) by 253 days.

(21) Appl. No.: 14/868,760

(22) Filed: Sep. 29, 2015

(65) Prior Publication Data
US 2016/0075214 A1  Mar. 17, 2016

Related U.S. Application Data

(63) Continuation of application No. PCT/JP2014/001190, filed on Mar. 4, 2014.

(30) Foreign Application Priority Data

Mar. 29, 2013 (JP) .................................. 2013-071896

(51) Int. Cl.
*F25B 13/00* (2006.01)
*B60H 1/32* (2006.01)
*B60H 1/00* (2006.01)

(52) U.S. Cl.
CPC ....... *B60H 1/3205* (2013.01); *B60H 1/00921* (2013.01)

(58) Field of Classification Search
CPC .............. B60H 1/3205; B60H 1/00921; B60H 1/00007; B60H 1/00057;
(Continued)

(56) References Cited

U.S. PATENT DOCUMENTS

| | | |
|---|---|---|
| 5,355,689 A | 10/1994 | Hara et al. |
| 2002/0035843 A1* | 3/2002 | Kampf ............... B60H 1/00328 62/231 |

(Continued)

FOREIGN PATENT DOCUMENTS

| | | |
|---|---|---|
| DE | 102010051471 A1 | 5/2012 |
| JP | H06-040235 A | 2/1994 |

(Continued)

OTHER PUBLICATIONS

Matsubara et al., Air Conditioner for Vehicle, Oct. 21, 2010, JP2010234847A, Whole Document.*

(Continued)

*Primary Examiner* — Larry Furdge
(74) *Attorney, Agent, or Firm* — Studebaker & Brackett PC

(57) ABSTRACT

A vehicle air conditioner comprising a heat pump device including a compressor that compresses refrigerant, first and second heat exchangers disposed inside the vehicle cabin within an interior air-conditioning unit, and a pressure reducing valve. The vehicle air conditioner further comprises an air-conditioning controller which controls the heat pump device and interior air-conditioning unit, an exterior heat exchanger temperature sensor and a degree-of-heating requested detecting section. If the quantity of heat absorbed by the exterior heat exchanger has decreased, the controller (Continued)

operates the heat pump device to operate in a mode in which a refrigerant discharged from the compressor flows through the first and second heat exchangers, bypasses the exterior heat exchanger, and then is sucked into the compressor, and a second mode in which the refrigerant is flow throughs the first heat exchanger and is bypassed around the second and exterior heat exchanger after pressure has been reduced.

2 Claims, 17 Drawing Sheets

(58) Field of Classification Search
CPC .......... B60H 2001/00121; B60H 2001/00949; B60H 2001/00957
See application file for complete search history.

(56) References Cited

U.S. PATENT DOCUMENTS

| | | |
|---|---|---|
| 2011/0167850 A1 | 7/2011 | Itoh et al. |
| 2014/0138049 A1 | 5/2014 | Schroeder et al. |

FOREIGN PATENT DOCUMENTS

| | | | |
|---|---|---|---|
| JP | H08-080730 A | | 3/1996 |
| JP | H08258533 A | * | 10/1996 |
| JP | H09-240266 A | | 9/1997 |
| JP | 2003-080931 A | | 3/2003 |
| JP | 2010-234847 A | | 10/2010 |
| JP | 2010234847 A | * | 10/2010 |
| JP | 2011-00583 A | | 1/2011 |
| JP | 2011-005983 A | | 1/2011 |
| JP | 2011-011686 A | | 1/2011 |
| JP | 2011-255734 A | | 2/2011 |
| JP | 2011-140291 A | | 7/2011 |
| JP | 2011-005735 | | 12/2011 |
| JP | 2011-255735 | | 12/2011 |

OTHER PUBLICATIONS

Hamamoto et al., Air Conditioner for Electric Vehicle, Oct. 8, 1996, JPH08258533A, Whole Document.*

International Search Report; PCT/JP2014/001190; dated Jun. 3, 2014.

* cited by examiner

VEHICLE AIR CONDITIONER

CROSS-REFERENCE TO RELATED APPLICATIONS

This is a continuation of International Application No. PCT/JP2014/001190 filed on Mar. 4, 2014, which claims priority to Japanese Patent Application No. 2013-071896 filed on Mar. 29, 2013. The entire disclosure of this application is hereby incorporated by reference.

BACKGROUND

The present invention relates to a vehicle air conditioner to be mounted on a vehicle, and more particularly relates to an air conditioner with a heat pump device.

An air conditioner with a heat pump device has been known in the art as an air conditioner to be mounted on electric vehicles and other kinds of vehicles. A heat pump device for use in each of those vehicles is formed by connecting together an electric compressor, an exterior heat exchanger provided outside the vehicle cabin, a pressure reducing valve, and an interior heat exchanger provided inside the vehicle cabin in this order via refrigerant piping (see, for example, Japanese Unexamined Patent Publication No. 2011-5983).

When the heat pump device operates in a heating operation mode, the refrigerant is allowed to flow so that the interior heat exchanger functions as a radiator and the exterior heat exchanger functions as a heat absorber. On the other hand, when the heat pump device operates in a cooling operation mode, the refrigerant is allowed to flow so that the interior heat exchanger functions as a heat absorber and the exterior heat exchanger functions as a radiator.

Meanwhile, a vehicle air conditioner as disclosed in Japanese Unexamined Patent Publication No. 2011-255735, for example, includes an upstream interior heat exchanger provided upstream in the airflow direction and a downstream interior heat exchanger provided downstream in that direction. Its refrigerant piping includes a four-way valve. By turning this four-way valve, a switch is made between multiple operation modes such as a heating operation mode and a cooling operation mode.

As another example, a vehicle air conditioner as disclosed in Japanese Unexamined Patent Publication No. H09-240266 includes, as interior heat exchangers, an upstream interior heat exchanger provided upstream in the airflow direction and a downstream interior heat exchanger provided downstream in that direction. The downstream interior heat exchanger functions as a radiator in both of heating and cooling operation modes, while the upstream interior heat exchanger functions as a heat absorber in both of the heating and cooling operation modes.

A heat pump device obtains a heating heat source from the outside air by making the exterior heat exchanger function as a heat absorber during the heating operation mode. However, in a situation where the outside air temperature has decreased to around −20° C., for example, it is difficult to absorb heat using the exterior heat exchanger, thus causing a significant decline in heating capacity.

To overcome such a problem, a heat source may be secured by using an electric heater such as a PTC heater. In the case of an electric vehicle, however, the use of an electric heater increases the consumption of a traction battery so much as to shorten its distance to empty. Likewise, in various kinds of vehicles other than electric vehicles, there is a demand for cutting down the power dissipation as much as possible.

In view of the foregoing background, it is therefore an object of the present invention to reduce the overall consumption of energy for air conditioning while maintaining comfortableness of air conditioning not only in cooling but also in heating as well.

SUMMARY

To achieve this object, according to the present invention, if the quantity of heat absorbed by an exterior heat exchanger has decreased, the operation modes are switched into a hot gas heating operation mode in which a refrigerant is allowed to flow while bypassing the exterior heat exchanger. In that hot gas heating operation mode, the refrigerant is supposed to flow through both of first and second interior heat exchangers.

A first aspect of the present invention is a vehicle air conditioner comprising:

a heat pump device including a compressor that compresses a refrigerant, a first interior heat exchanger provided inside a vehicle cabin, a second interior heat exchanger provided inside the vehicle cabin and upstream of the first interior heat exchanger in an airflow direction, an exterior heat exchanger provided outside the vehicle cabin, and a pressure reducing valve, the heat pump device being formed by connecting together the compressor, the first and second interior heat exchangers, the pressure reducing valve and the exterior heat exchanger via refrigerant piping, the heat pump device further including a bypass pipe to allow the refrigerant to flow while bypassing the exterior heat exchanger, the heat pump device being switchable between multiple operation modes;

an interior air-conditioning unit which houses the first and second interior heat exchangers and which includes a blower that blows air-conditioning air to the first and second interior heat exchangers, the interior air-conditioning unit being configured to produce conditioned air and supply the conditioned air into the vehicle cabin; and an air-conditioning controller configured to control the heat pump device and the interior air-conditioning unit.

The air conditioner further includes a decrease-in-quantity-of-heat-absorbed detecting means for determining whether or not the quantity of heat absorbed by the exterior heat exchanger has decreased during heating.

If the decrease-in-quantity-of-heat-absorbed detecting means has sensed that the quantity of heat absorbed by the exterior heat exchanger is equal to or smaller than a first predetermined value, the air-conditioning controller makes the heat pump device operate in a hot gas heating operation mode including a first hot gas heating operation mode in which the refrigerant discharged from the compressor is allowed to flow through the first and second interior heat exchangers so that each of these interior heat exchangers functions as a radiator, bypass the exterior heat exchanger with pressure reduced by the pressure reducing valve, and then be sucked into the compressor.

According to this configuration, if the quantity of heat absorbed by an exterior heat exchanger has decreased (e.g., if the outside air temperature has decreased to −20° C. or less), then the operation modes are switched into a hot gas heating operation mode in which a refrigerant is allowed to flow while bypassing the exterior heat exchanger, which thus allows for achieving a heating capacity without using any electric heater. In addition, in a first hot gas heating operation mode, a high-temperature refrigerant discharged from a compressor is made to flow through both of first and second interior heat exchangers. This allows for increasing the heating capacity inside the vehicle cabin.

A second aspect of the present invention is an embodiment of the first aspect of the present invention. In the second aspect, the air-conditioning controller makes the heat pump device operate in a hot gas heating operation mode including a second hot gas heating operation mode in which the refrigerant discharged from the compressor is allowed to flow through the first interior heat exchanger, bypass the second interior heat exchanger, further bypass the exterior heat exchanger after pressure has been reduced by the pressure reducing valve, and then be sucked into the compressor.

According to this configuration, if a high heating capacity needs to be achieved, the operation modes may be switched into the first hot gas heating operation mode. On the other hand, if the heating capacity may be low, then the mode of operation may be the second hot gas heating operation mode. This thus allows for heating the vehicle cabin with the capacity controlled depending on the situation.

A third aspect of the present invention is an embodiment of the second aspect of the present invention. In the third aspect, the vehicle air conditioner includes a degree-of-heating-requested detecting means for detecting the degree of heating requested.

The air-conditioning controller makes the heat pump device operate in a first hot gas heating operation mode if the degree-of-heating-requested detecting means has found the degree of heating requested high, and makes the heat pump device operate in a second hot gas heating operation mode if the degree-of-heating-requested detecting means has found the degree of heating requested low.

This configuration allows for choosing an appropriate hot gas heating operation mode according to the degree of heating requested.

A fourth aspect of the present invention is an embodiment of the second aspect of the present invention. In the fourth aspect, the vehicle air conditioner includes a quality-of-wet-vapor detecting means for detecting the quality of wet vapor of the refrigerant sucked into the compressor.

The air-conditioning controller makes a switch between the first and second hot gas heating operation modes in accordance with the quality of wet vapor of the sucked refrigerant detected by the quality-of-wet-vapor detecting means.

According to this configuration, a switch is made between the first and second hot gas heating operation modes in accordance with the quality of wet vapor of the sucked refrigerant. This prevents the compressor from operating in wet condition, thus increasing the reliability of the heat pump device.

A fifth aspect of the present invention is an embodiment of any one of the first to fourth aspects of the present invention. In the fifth aspect, the heat pump device includes a refrigerant heater provided between the pressure reducing valve and the compressor.

If the decrease-in-quantity-of-heat-absorbed detecting means has sensed that the quantity of heat absorbed by the exterior heat exchanger is equal to or smaller than a second predetermined value that is less than the first predetermined value, the air-conditioning controller activates the refrigerant heater to make the heat pump device operate in a hot gas heating operation mode.

According to this configuration, some heating capacity is ensured by activating the refrigerant heater if the outside air temperature has further decreased to the point that no heat can be absorbed at all from the outside air.

A sixth aspect of the present invention is an embodiment of any one of the first to fifth aspects of the present invention. In the sixth aspect, the decrease-in-quantity-of-heat-absorbed detecting means is an outside air temperature sensor that detects the temperature of air outside of the vehicle cabin.

This configuration allows for detecting a decrease in the quantity of heat absorbed with reliability and at a low cost.

A seventh aspect of the present invention is an embodiment of any one of the first to fifth aspects of the present invention. In the seventh aspect, the decrease-in-quantity-of-heat-absorbed detecting means is a frosting detecting means for detecting a frosting condition of the exterior heat exchanger.

Specifically, if the exterior heat exchanger is frosted, the heat exchange efficiency decreases, so does the quantity of heat absorbed during heating. According to the present invention, frosting in the exterior heat exchanger is detected, thereby determining whether or not the quantity of heat absorbed has decreased. This allows for performing a control depending on the condition of the exterior heat exchanger.

An eighth aspect of the present invention is an embodiment of the fifth aspect of the present invention. In the eighth aspect, the refrigerant heater is an electric heater that generates heat when supplied with power from a battery mounted on the vehicle.

This configuration allows a vehicle air conditioner according to the present invention to be mounted and operated on an electric vehicle, for example.

A ninth aspect of the present invention is an embodiment of the eighth aspect of the present invention. In the ninth aspect, the vehicle air conditioner includes a battery level detecting means for detecting a charge level of the battery.

If the charge level of the battery detected by the battery level detecting means is equal to or smaller than a predetermined value, the air-conditioning controller prohibits the refrigerant heater from being activated.

This configuration allows for cutting down the power to be dissipated for heating when the charge level of a battery is low.

A tenth aspect of the present invention is an embodiment of the eighth aspect of the present invention. In the tenth aspect, the vehicle air conditioner includes a charging detecting means for determining whether the battery is being charged or not.

If the charging detecting means has sensed that the battery is now being charged, the air-conditioning controller activates the refrigerant heater.

This configuration allows for preparing to heat the vehicle cabin while the battery is being charged, i.e., before the vehicle starts to travel. In this case, the refrigerant heater is used to absorb heat into the refrigerant, thus ensuring some heating capacity for the vehicle that starts to travel when charged, without getting the exterior heat exchanger frosted. In addition, since the refrigerant heater is activated during charging, the vehicle's distance to empty is not affected.

An eleventh aspect of the present invention is an embodiment of the third aspect of the present invention. In the eleventh aspect, the interior air-conditioning unit includes an electric air heater, and the air-conditioning controller determines whether or not an air condition inside the vehicle cabin is going to reach a degree of heating requested detected by the degree-of-heating-requested detecting means, and activates the air heater if the controller has decided that the condition will not reach the degree of heating requested.

According to this configuration, unless the degree of heating requested is achieved even by performing a hot gas heating mode of operation, for example, an electric air heater is activated, thus enabling compensation for the heating capacity.

A twelfth aspect of the present invention is an embodiment of any one of the first to eleventh aspects of the present invention. In the twelfth aspect, the air-conditioning controller makes the heat pump device operate in the second hot gas heating operation mode at the beginning of heating.

According to this configuration, the mode of operation is set to be the second hot gas heating operation mode at the beginning of heating, which allows for decreasing the overall volume of piping in one cycle and increasing the amount of the refrigerant circulated. This results in an early rise in pressure to a high level and an increase in quickness of heating.

According to the first aspect of the present invention, if the quantity of heat absorbed by the exterior heat exchanger has decreased, the operation modes are switched into a first hot gas heating operation mode in which the refrigerant discharged from the compressor is allowed to flow through the first and second interior heat exchangers, bypass the exterior heat exchanger with pressure reduced, and then be sucked into the compressor. This allows for reducing the overall consumption of energy for air conditioning while maintaining comfortableness of air conditioning not only in cooling but also in heating as well.

According to the second aspect of the present invention, if a high heating capacity needs to be achieved, the operation modes may be switched into the first hot gas heating operation mode. On the other hand, if the heating capacity may be low, then the mode of operation may be the second hot gas heating operation mode. This thus allows for heating the vehicle cabin with the capacity controlled depending on the situation.

According to the third aspect of the present invention, if the degree of heating requested is high, the operation modes may be switched into the first hot gas heating operation mode. On the other hand, if the degree of heating requested may be low, then the mode of operation may be the second hot gas heating operation mode. This thus allows for increasing comfortableness in the vehicle cabin.

According to the fourth aspect of the present invention, a switch is made between the first and second hot gas heating operation modes in accordance with the quality of wet vapor of the refrigerant sucked into the compressor. This prevents the compressor from operating in wet condition, thus increasing the reliability of the heat pump device.

According to the fifth aspect of the present invention, if the quantity of heat absorbed by the exterior heat exchanger is even smaller, the refrigerant heater is activated to switch the modes into a hot gas heating operation mode. This thus ensures some heating capacity.

According to the sixth aspect of the present invention, a decrease in the quantity of heat absorbed by the exterior heat exchanger is detected by an outside air temperature sensor, thus allowing for detecting a decrease in the quantity of heat absorbed with reliability and at a low cost.

According to the seventh aspect of the present invention, a decrease in the quantity of heat absorbed by the exterior heat exchanger is detected by a frosting detecting means of the exterior heat exchanger. This allows for performing a control depending on the condition of the exterior heat exchanger.

According to the eighth aspect of the present invention, the refrigerant heater is implemented as an electric heater, thus allowing a vehicle air conditioner according to the present invention to be mounted on an electric vehicle, for example.

According to the ninth aspect of the present invention, the refrigerant heater is prohibited from being activated if the battery charge level of a vehicle is low, thus allowing for increasing the distance to empty when a vehicle air conditioner according to the present invention is mounted on an electric vehicle.

According to the tenth aspect of the present invention, if the battery is being charged, the refrigerant heater is activated, thus allowing for ensuring some heating capacity before the vehicle starts to travel and after the vehicle has traveled and increasing the occupant's comfortableness. In addition, when the vehicle air conditioner is mounted on an electric vehicle, the distance to empty is hardly affected.

According to the eleventh aspect of the present invention, the air heater is activated if the decision has been made that the degree of heating requested will not be reached even by performing a hot gas heating mode of operation. This thus allows for increasing the occupant's comfortableness.

According to the twelfth aspect of the present invention, the operation modes are switched into a second hot gas heating operation mode at the beginning of heating, thus resulting in an increase in quickness of heating.

DETAILED DESCRIPTION

Embodiments of the present invention will now be described in detail with reference to the accompanying drawings. Note that the following description of preferred embodiments is only an example in nature and is not intended to limit the scope, applications or use of the invention.

Figure 1:
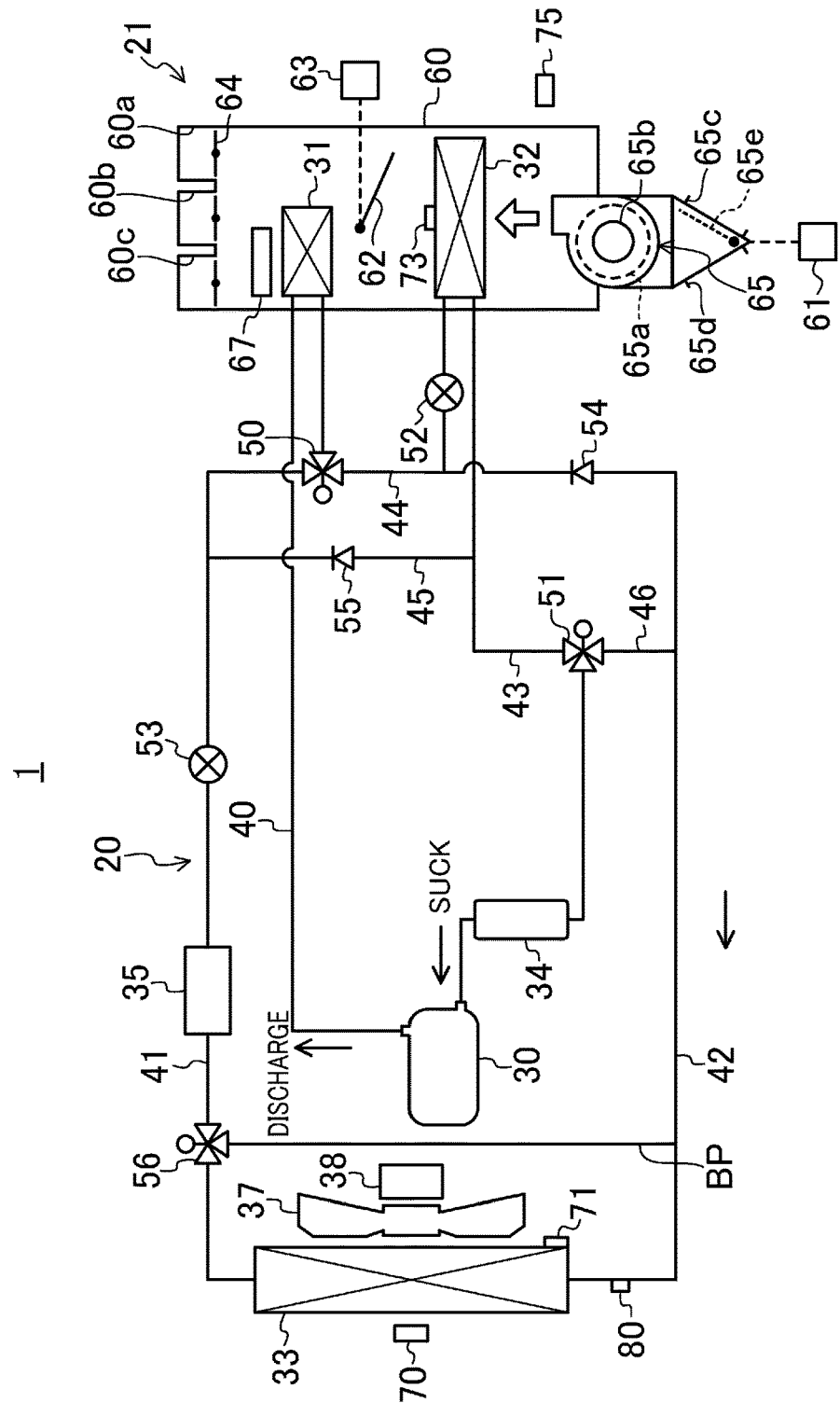
FIG. 1 generally illustrates a configuration for a vehicle air conditioner according to an embodiment.

FIG. 1 generally illustrates a configuration for a vehicle air conditioner 1 according to an embodiment of the present invention. A vehicle on which the vehicle air conditioner 1 is mounted may be an electric vehicle including a traction battery B (shown in FIG. 2) and a traction motor (not shown).

This vehicle air conditioner 1 includes a heat pump device 20, an interior air-conditioning unit 21, and an air-conditioning controller 22 (shown in FIG. 2) that controls the heat pump device 20 and the interior air-conditioning unit 21.

The heat pump device 20 includes: a motor-driven compressor 30 that compresses a refrigerant; a downstream interior heat exchanger (first interior heat exchanger) 31 provided inside the vehicle cabin; an upstream interior heat exchanger (second interior heat exchanger) 32 provided upstream of the downstream interior heat exchanger 31 in an airflow direction inside the vehicle cabin; an exterior heat exchanger 33 provided outside the vehicle cabin; an accumulator 34; and first to fourth main refrigerant pipes 40 to 43, first to third branch refrigerant pipes 44 to 46 and a bypass pipe BP which connect all of these members 30 to 34 together. The heat pump device 20 further includes a refrigerant heater 35.

The motor-driven compressor 30 is an onboard compressor which has been known in the art, and is driven by an electric motor. The discharge rate per unit time is variable by changing the number of revolutions of the motor-driven compressor 30. The motor-driven compressor 30 is connected to an air-conditioning controller 22 so as to have its ON/OFF states switched and its number of revolutions controlled. The motor-driven compressor 30 is supplied with power from the traction battery B.

Figure 3:
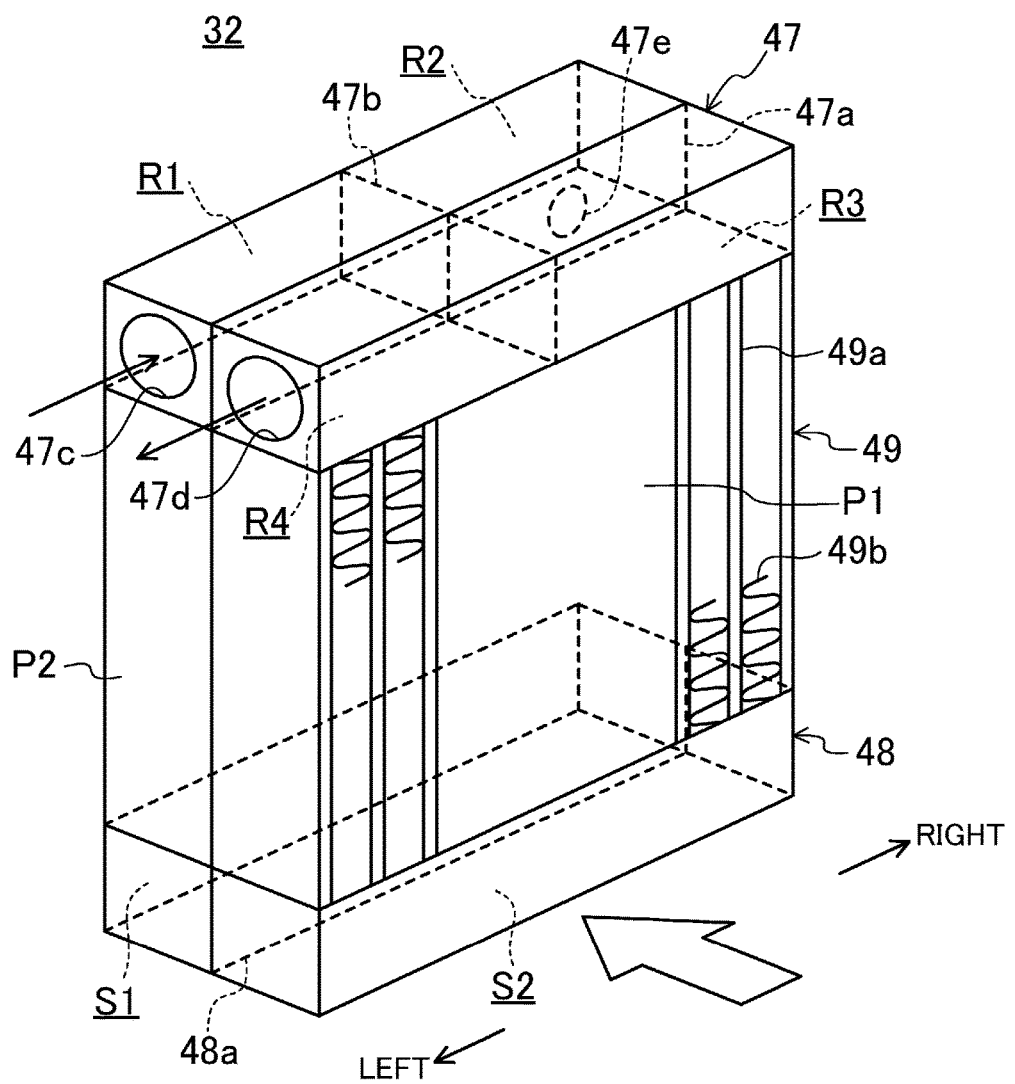
FIG. 3 is a perspective view illustrating an upstream interior heat exchanger as viewed from an upstream side in an airflow direction.

As shown in FIG. 3, the upstream interior heat exchanger 32 includes an upper header tank 47, a lower header tank 48, and a core 49. The core 49 is obtained by alternately arranging horizontally (i.e., laterally in FIG. 3), and assembling together, vertically extending tubes 49a and fins 49b and is configured so that air-conditioning air passes between those tubes 49a. The flow direction of the air-conditioning air is indicated by the open arrow. Two rows of tubes 49a are arranged in the flow direction of the outside air.

The respective upper ends of the tubes 49a located upstream and downstream in the airflow direction are both connected to the upper header tank 47 so as to communicate with each other. Inside the upper header tank 47, provided is a first partition 47a which partitions the inside of the upper header tank 47 into an airflow upstream portion and an airflow downstream portion. The space located upstream of the first partition 47a in the airflow direction communicates with the respective upper ends of the upstream tubes 49a. On the other hand, the space located downstream of the first partition 47a in the airflow direction communicates with the respective upper ends of the downstream tubes 49a.

Inside the upper header tank 47, also provided is a second partition 47b which partitions the inside of the upper header tank 47 horizontally. A communication hole 47e has been cut through a portion of the first partition 47a which is located on the right-hand side of the second partition 47b.

A refrigerant inlet 47c has been cut through a portion of the left side surface of the upper header tank 47 downstream in the airflow direction, and a refrigerant outlet 47d has been cut upstream in the airflow direction.

Inside the lower header tank 48, also provided is a partition 48a which partitions the inside of the lower header tank 48 into airflow upstream and downstream portions, just like the first partition 47a of the upper header tank 47. The space located upstream of the partition 48a in the airflow direction communicates with the respective lower ends of the upstream tubes 49a, while the space located downstream of the partition 48a in the airflow direction communicates with the respective lower ends of the downstream tubes 49a.

Having such a configuration, this upstream heat exchanger 32 has four paths in total. Specifically, first of all, a refrigerant flowing in through the inlet 47c enters a room R1 which is located downstream of the first partition 47a of the upper header tank 47 in the airflow direction and on the left hand side of the second partition 47b. Then, the refrigerant flows downward through the tubes 49a communicating with this room R1.

Thereafter, the refrigerant enters the space 51 of the lower header tank 48 which is located downstream of the partition 48a in the airflow direction, flows to the right, and then flows upward through the tubes 49a. Then, the refrigerant enters the room R2 of the upper header tank 47 located downstream of the first partition 47a in the airflow direction and on the right hand side of the second partition 47b.

Subsequently, the refrigerant in the room R2 passes through the communication hole 47e of the first partition 47a, enters the room R3 of the upper header tank 47 located upstream of the first partition 47a in the airflow direction and on the right hand side of the second partition 47b, and then flows downward through the tubes 49a communicating with the room R3.

After that, the refrigerant enters the space S2 of the lower header tank 48 located upstream of the partition 48a in the airflow direction, flows to the left, and then flows upward through the tubes 49a. Thereafter, the refrigerant enters the room R4 of the upper header tank 47 located upstream of the first partition 47a in the airflow direction and on the left hand side of the second partition 47b, and then flows out through the outlet 47d.

In the upstream interior heat exchanger 32, a windward path P1 is constituted by the path upstream in the airflow direction, and a leeward path P2 is constituted by the path downstream in the airflow direction.

The downstream interior heat exchanger 31 just has a smaller size than, but has the same or similar structure as/to, the upstream interior heat exchanger 32, and a detailed description thereof will be omitted herein. Optionally, the downstream and upstream interior heat exchangers 31 and 32 may have different structures.

The exterior heat exchanger 33 is provided near the front end of a motor room (corresponding to the engine room of an engine-driven vehicle) in a front portion of a vehicle, and is configured to catch the wind blowing against the vehicle traveling. Although not shown, the exterior heat exchanger 33 also includes an upper header tank, a lower header tank and a core. The core includes a tube that extends vertically.

As shown in FIG. 1, a cooling fan 37 is provided for the vehicle. This cooling fan 37 is driven by a fan motor 38, and is configured to blow air to the exterior heat exchanger 33. The fan motor 38 is connected to the air-conditioning controller 22 to have its ON/OFF states switched and its number of revolutions controlled. The fan motor 38 is also supplied with electric power from the traction battery B. Note that the cooling fan 37 may also blow air to a radiator that cools a traction inverter, for example, and may also be activated even if air conditioning is not requested.

The accumulator 34 is provided near the suction port of the motor-driven compressor 30 and halfway along the fourth main refrigerant pipe 43.

On the other hand, the first main refrigerant pipe 40 connects together the discharge port of the motor-driven compressor 30 and the refrigerant inlet of the downstream interior heat exchanger 31. Moreover, the second main refrigerant pipe 41 connects together the refrigerant outlet of the downstream interior heat exchanger 31 and the refrigerant inlet of the exterior heat exchanger 33. The third main refrigerant pipe 42 connects together the refrigerant outlet of the exterior heat exchanger 33 and the refrigerant inlet of the upstream interior heat exchanger 32. The fourth main refrigerant pipe 43 connects together the refrigerant outlet of the upstream interior heat exchanger 32 and the suction port of the motor-driven compressor 30.

The first branch refrigerant pipe 44 branches from the second main refrigerant pipe 41, and is connected to the third main refrigerant pipe 42. The second branch refrigerant pipe 45 branches from the second main refrigerant pipe 41, and is connected to the fourth main refrigerant pipe 43. The third branch refrigerant pipe 46 branches from the third main refrigerant pipe 42, and is connected to the fourth main refrigerant pipe 43.

The bypass pipe BP is a pipe which makes the refrigerant flowing through the second main refrigerant pipe 41 bypass the exterior heat exchanger 33 and flow through the third main refrigerant pipe 42. The bypass pipe BP is connected to a point on the second main refrigerant pipe 41 upstream of the exterior heat exchanger 33 and also connected to a point on the third main refrigerant pipe 42 downstream of the exterior heat exchanger 33.

The heat pump device 20 further includes a first flow path switching valve 50, a second flow path switching valve 51, a first pressure reducing valve 52, a second pressure reducing valve 53, a first check valve 54, a second check valve 55 and a bypass switching valve 56.

The first flow path switching valve 50, the second flow path switching valve 51 and the bypass switching valve 56 are configured as electric three-way valves, and are controlled by the air-conditioning controller 22. The first flow path switching valve 50 is provided halfway along the second main refrigerant pipe 41, and the first branch refrigerant pipe 44 is connected to the valve 50. The second flow path switching valve 51 is provided halfway along the fourth main refrigerant pipe 43, and the third branch refrigerant pipe 46 is connected to the valve 51. The bypass switching valve 56 is provided halfway along the second main refrigerant pipe 41 and downstream of the first flow path switching valve 50 in the refrigerant flow direction and an upstream side of the bypass pipe BP is connected to the bypass switching valve 56. By being switched by the air-conditioning controller 22, the bypass switching valve 56 allows the refrigerant flowing through the second main refrigerant pipe 41 to pass through only the exterior heat exchanger 33, only the bypass pipe BP, or both the exterior heat exchanger 33 and the bypass pipe BP selectively. The flow rate ratio of the refrigerants flowing through the exterior heat exchanger 33 and the bypass pipe BP is changeable arbitrarily.

The first and second pressure reducing valves 52 and 53 are electric types to be controlled by the air-conditioning controller 22 to operate in either a closing direction in which the valves exhibit a pressure reducing action or in an opening direction in which the valves exhibit no pressure reducing action. The degrees of opening of the first and second pressure reducing valves 52 and 53 are ordinarily set according to the condition of the air-conditioning load, but may also be set to be an arbitrary degree irrespective of the air-conditioning load.

The first pressure reducing valve 52 is provided closer to the upstream interior heat exchanger 32 than the point of connection between the third main refrigerant pipe 42 and the first branch refrigerant pipe 44 is, i.e., provided on a refrigerant pipe leading to the refrigerant inlet of the upstream interior heat exchanger 32. On the other hand, the second pressure reducing valve 53 is provided on the second main refrigerant pipe 41 between the first flow path switching valve 50 and the bypass switching valve 56. That is to say, the second pressure reducing valve 53 is arranged on the second main refrigerant pipe 41 between the point of connection with the bypass pipe BP and the downstream interior heat exchanger 31.

The first check valve 54 is provided on the third main refrigerant pipe 42, and is configured to allow the refrigerant to flow through the third main refrigerant pipe 42 from the exterior heat exchanger 33 toward the upstream interior heat exchanger 32 and to prevent the refrigerant from flowing in the reverse direction.

The second check valve 55 is provided on the second branch refrigerant pipe 45, and is configured to allow the refrigerant to flow through the second branch refrigerant pipe 45 from the fourth main refrigerant pipe 43 toward the second main refrigerant pipe 41 and to prevent the refrigerant from flowing in the reverse direction.

The refrigerant heater 35 is arranged on the second main refrigerant pipe 41 between the second pressure reducing valve 53 and the bypass switching valve 56, i.e., between the second pressure reducing valve 53 and the motor-driven compressor 30. The refrigerant heater 35 is configured as an electric heater that heats the refrigerant flowing through the second main refrigerant pipe 41, and has its ON/OFF states switched, and the degree of heating adjusted, by the air-conditioning controller 22. The refrigerant heater 35 is also supplied with electric power from the traction battery B.

The interior air-conditioning unit 21 further includes a casing 60 housing the downstream and upstream interior heat exchangers 31 and 32, an air mix door (temperature controlling door) 62, an air mix door actuator 63 that drives the air mix door 62, blowout-mode switching doors 64, a blower 65, and a PTC heater (electric air heater) 67.

The blower 65 is provided to select one of the air inside the vehicle cabin (inside air) or the air outside the vehicle cabin (outside air) and blow the selected air as air-conditioning air into the casing 60. The blower 65 includes a sirocco fan 65*a* and a blower motor 65*b* that drives the sirocco fan 65*a* in rotation. The blower motor 65*b* is connected to the air-conditioning controller 22 to have its ON/OFF states switched and its number of revolutions controlled. The blower motor 65*b* is also supplied with electric power from the traction battery B.

The blower 65 is provided with an inside air inlet port 65*c* to introduce the inside air and an outside air inlet port 65*d* to introduce the outside air. Inside the blower 65, provided is an inside/outside air switching door 65*e* to open one of the inside and outside air inlet ports 65*c* and 65*d* and close the other. The blower 65 is further provided with an inside/outside air switching door actuator 61 to drive the inside/outside air switching door 65*e*. This inside/outside air switching door actuator 61 is controlled by the air-conditioning controller 22. The blower 65 is configured to have its air introducing modes switched between an inside air introducing mode in which the inside air inlet port 65*c* is fully opened and the outside air inlet port 65*d* is fully closed and an outside air introducing mode in which the inside air inlet port 65*c* is fully closed and the outside air inlet port 65*d* is fully opened. The blower 65 is configured so as to allow the occupant to select either one of the inside and outside air introducing modes by turning a switch. However, the blower 65 is also configured so that the air-conditioning controller 22 automatically switches the modes under a predetermined condition.

The casing 60 is provided inside an instrument panel (not shown) in the vehicle cabin. The casing 60 has a defroster outlet port 60*a*, a vent outlet port 60*b*, and a heat outlet port 60*c*. The defroster outlet port 60*a* is provided to supply the air-conditioning air to the inner surface of the windshield in the vehicle cabin. The vent outlet port 60*b* is provided to supply the air-conditioning air to (mainly the upper body of) the occupant in the vehicle cabin. The heat outlet port 60*c* is provided to supply the air-conditioning air to the feet of the occupant in the cabin.

These outlet ports 60*a*-60*c* are each opened and closed by an associated one of the blowout-mode switching doors 64. Although not shown, the blowout-mode switching doors 64 are operated by an actuator connected to the air-conditioning controller 22.

Examples of the blowout modes include a defroster blowout mode in which the air-conditioning air is supplied to the defroster outlet port 60*a*, a vent blowout mode in which the air-conditioning air is supplied to the vent outlet port 60*b*, a heat blowout mode in which the air-conditioning air is supplied to the heat outlet port 60*c*, a defroster/heat mode in which the air-conditioning air is supplied to the defroster outlet port 60*a* and the heat outlet port 60*c*, and a bi-level mode in which the air-conditioning air is supplied to the vent outlet port 60*b* and the heat outlet port 60*c*.

All of the air-conditioning air introduced into the casing 60 passes through the upstream interior heat exchanger 32.

In the casing 60, the air mix door 62 is provided between the upstream and downstream interior heat exchangers 32 and 31. The air mix door 62 is configured to control the temperature of the air-conditioning air such that the air that has passed through the upstream interior heat exchanger 32 which is going to pass through the downstream interior heat exchanger 31 is changed to determine a mixing ratio between the air that has passed through the upstream interior heat exchanger 32 and the air that has passed through the downstream interior heat exchanger 31.

The PTC heater 67 is arranged downstream of the downstream interior heat exchanger 33 in the airflow direction inside the casing 60 in order to heat the air-conditioning air flowing inside the casing 60. The PTC heater 67 is controlled by the air-conditioning controller 22 so as to have its ON/OFF states switched and have the degree of heating changed. The PTC heater 67 is supplied with electric power from the traction battery B.

Figure 2:
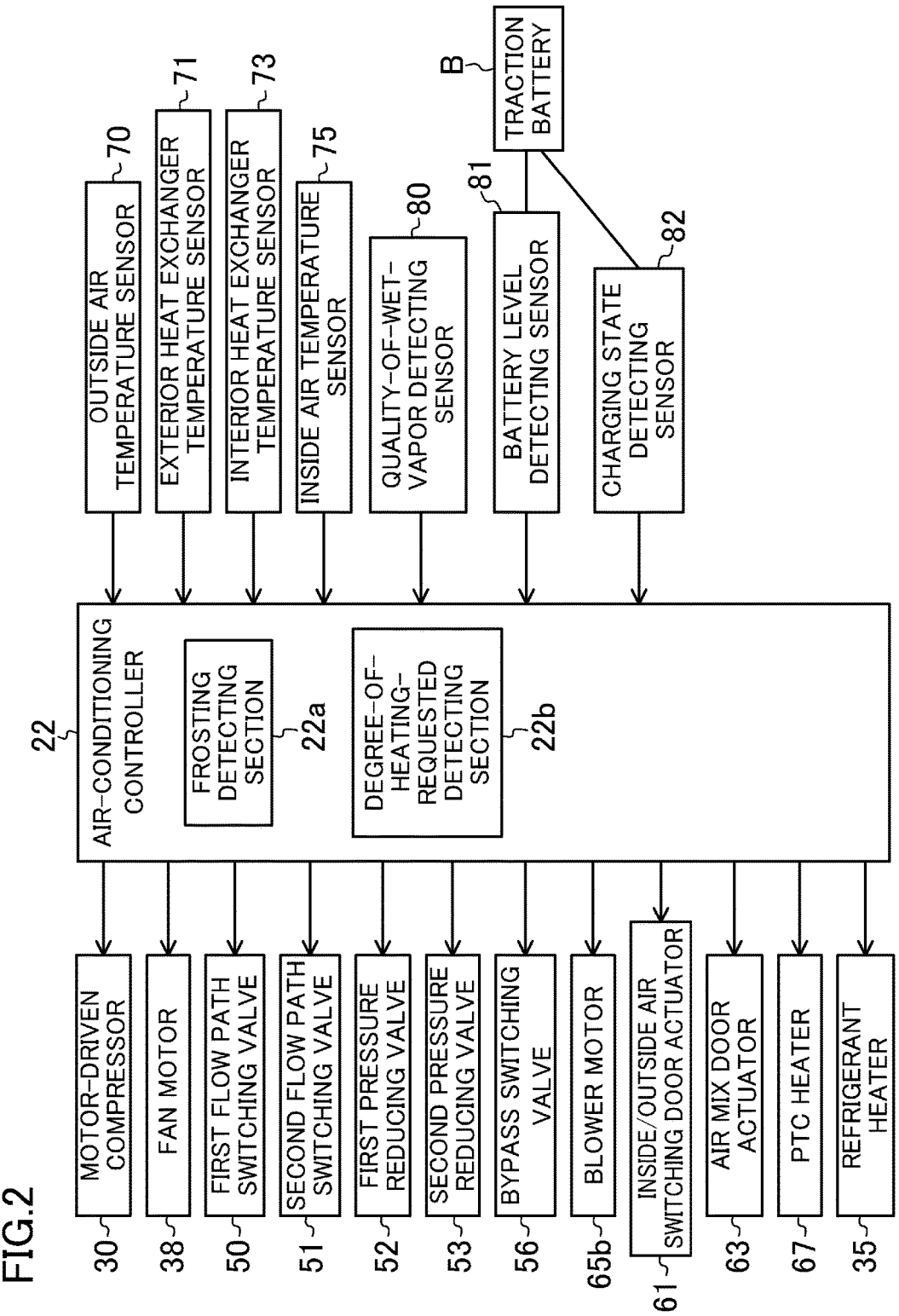
FIG. 2 is a block diagram of a vehicle air conditioner.

The vehicle air conditioner 1 further includes an outside air temperature sensor 70, an exterior heat exchanger temperature sensor 71, an interior heat exchanger temperature sensor 73, an inside air temperature sensor 75, a quality-of-wet-vapor detecting sensor (quality-of-wet-vapor detecting means) 80, a battery level detecting sensor 81 (shown in FIG. 2), and a charging state detecting sensor 82 (shown in FIG. 2). These sensors are connected to the air-conditioning controller 22.

The outside air temperature sensor 70 is provided upstream of the exterior heat exchanger 33 in the airflow direction in order to detect the temperature of the outside air (outside air temperature TG) that has not entered the exterior heat exchanger 33 yet. On the other hand, the exterior heat exchanger temperature sensor 71 is arranged on a surface of the exterior heat exchanger 33 which is located downstream in the airflow direction in order to detect the surface temperature of the exterior heat exchanger 33.

The interior heat exchanger temperature sensor 73 is provided downstream of the upstream interior heat exchanger 32 in the airflow direction in order to detect the surface temperature of the upstream interior heat exchanger 32. Based on the temperature of the upstream interior heat exchanger 32 detected downstream in the airflow direction by the interior heat exchanger temperature sensor 73, a determination may be made whether or not frost has been deposited in the upstream interior heat exchanger 32.

The inside air temperature sensor 75 is provided to detect the temperature inside the vehicle cabin (the inside air temperature TR) and is arranged at a predetermined position inside the vehicle cabin. The inside air temperature sensor 75 is a sensor that has been known in the art, and a detailed description thereof will be omitted herein.

The quality-of-wet-vapor detecting sensor 80 is a sensor for detecting the quality of wet vapor of the refrigerant to be sucked into the motor-driven compressor 30, and is configured to detect the quality of wet vapor based on the pressure and temperature of the refrigerant near the refrigerant outlet of the exterior heat exchanger 33.

The battery level detecting sensor 81 is equivalent to a battery level detecting means according to the present invention, and has the ability to detect the level of the traction battery B. The battery level detecting sensor 81 may be a known one.

The charging state detecting sensor 82 is equivalent to a charging detecting means according to the present invention, and has the ability to determine whether or not the traction battery B is being charged by an external power supply. The "external power supply" refers herein to any power supply other than the vehicle's power generator, and may be a household wall outlet or parking lot charging equipment, for example. This charging state detecting sensor 82 may also be a known one.

Although not shown, the vehicle air conditioner 1 also includes a solar radiation sensor and other kinds of sensors.

The air-conditioning controller 22 is configured to control the heat pump device 20 and other components by reference to multiple pieces of information including the temperature set by the occupant, the outside air temperature, the temperature inside the vehicle cabin, and the intensity of solar radiation. The air-conditioning controller 22 may be implemented as a well-known central processing unit, ROM, or RAM, for example. In addition, the air-conditioning controller 22 further controls the motor-driven compressor 30 and the fan motor 38 depending on the air-conditioning load.

As in an ordinary automatic air conditioning control, the air-conditioning controller 22 controls, through a main routine to be described later, a switch of the operation modes of the heat pump device 20, the volume of the air to be blown by the blower 65, the degree of opening of the air mix door 62, a switch of the blowout modes, the motor-driven compressor 30, and the blower motor 65b. For example, although the fan motor 38 is basically activated while the motor-driven compressor 30 is activated, the fan motor 38 also is activated even if the motor-driven compressor 30 is at a stop, e.g., when the traction inverter needs to be cooled.

The operation modes of the heat pump device 20 include: a cooling operation mode; a normal heating operation mode; a first hot gas heating operation mode; a second hot gas heating operation mode; a refrigerant-heated heating operation mode; a powerful defrosting operation mode; a moderate defrosting operation mode; a gentle defrosting operation mode; a first heating-dominant defrosting operation mode; and a second heating-dominant defrosting operation mode.

Figure 4:
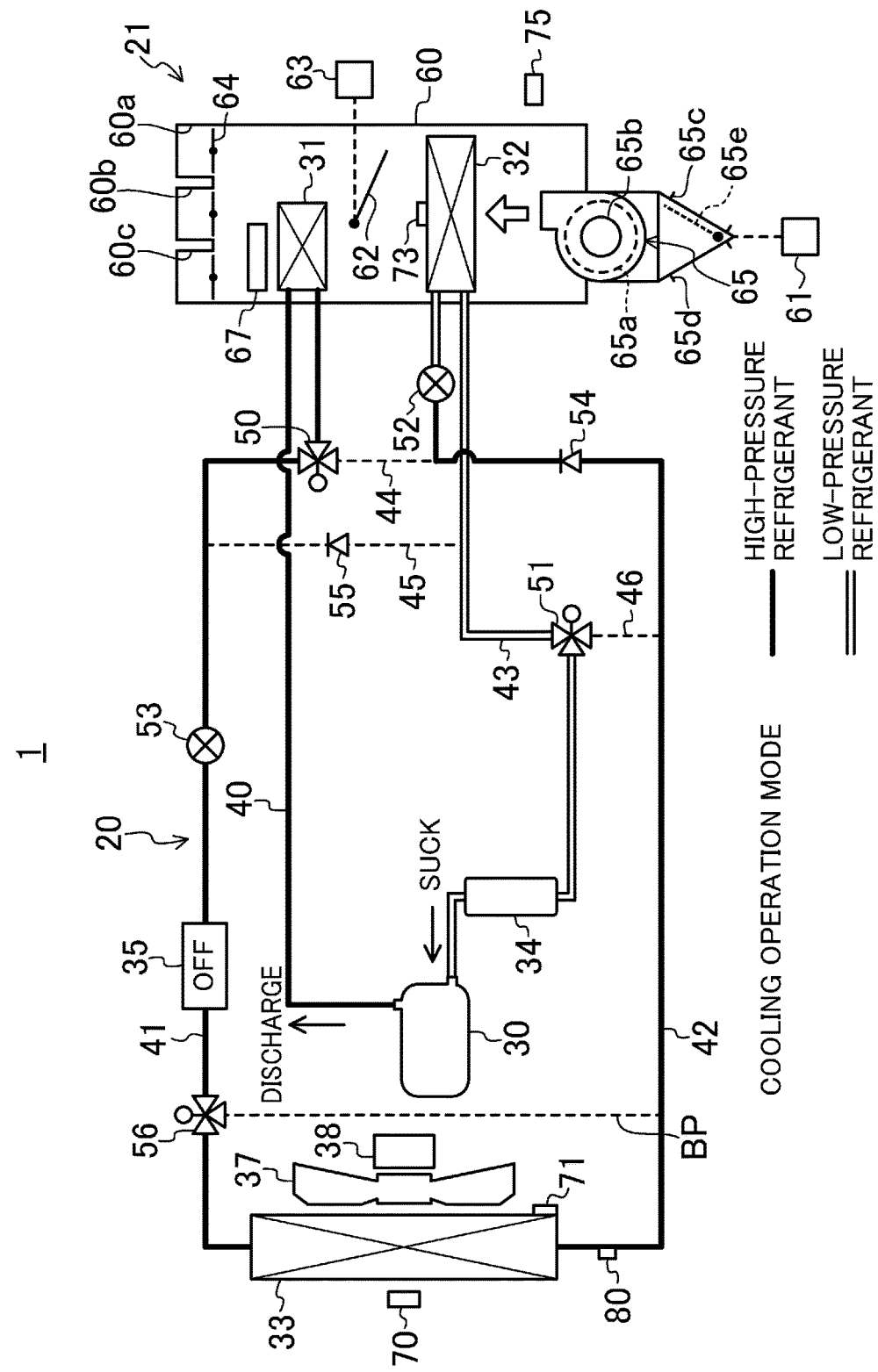
FIG. 4 is a diagram corresponding to FIG. 1 and illustrating how the air conditioner operates in a cooling operation mode.

The cooling operation mode shown in FIG. 4 is selected when the outside air temperature is higher than 25° C., for example. In the cooling operation mode, the downstream interior heat exchanger 31 is made to function as a radiator, the upstream interior heat exchanger 32 is made to function as a heat absorber, and the exterior heat exchanger 33 is made to function as a radiator.

Specifically, the first flow path switching valve 50 switches the flow paths such that a refrigerant that has flowed out of the downstream interior heat exchanger 31 does not flow into the upstream interior heat exchanger 32 through the inlet thereof but flows toward the second pressure reducing valve 53. On the other hand, the second flow path switching valve 51 switches the flow paths such that the refrigerant that has flowed out of the upstream interior heat exchanger 32 flows into the accumulator 34. The bypass switching valve 56 switches the flow paths such that the refrigerant flowing through the second main refrigerant pipe 41 flows through only the exterior heat exchanger 33. The first pressure reducing valve 52 is turned into the expansion state, and the second pressure reducing valve 53 is turned into the non-expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows, without expanding, into the exterior heat exchanger 33 through the second main refrigerant pipe 41. The refrigerant that has flowed into the exterior heat exchanger 33 dissipates heat, and expands by passing through the first pressure reducing valve 52 via the third main refrigerant pipe 42. Then, the refrigerant flows into the upstream interior heat exchanger 32. The refrigerant that has flowed into the upstream interior heat exchanger 32 circulates through the upstream interior heat exchanger 32 to absorb heat from the air-conditioning air. The refrigerant that has circulated through the upstream interior heat exchanger 32 passes through the fourth main refrigerant pipe 43 and is sucked into the motor-driven compressor 30 via the accumulator 34.

Figure 5:
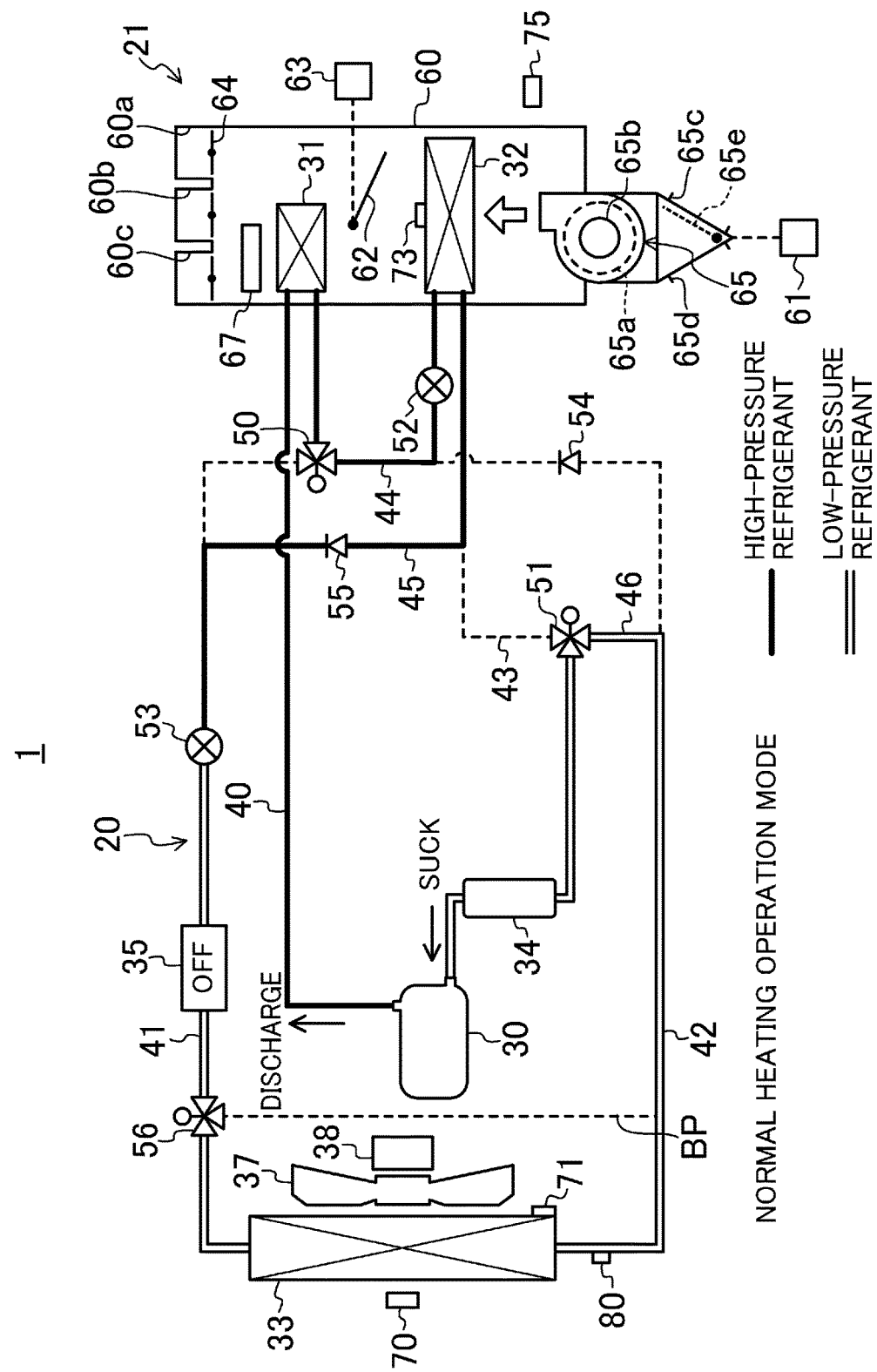
FIG. 5 is a diagram corresponding to FIG. 1 and illustrating how the air conditioner operates in a normal heating operation mode.

The normal heating operation mode shown in FIG. 5 is selected when the outside air temperature is lower than 0° C. (at an extremely-low outside air temperature), for example. In the normal heating operation mode, the downstream and upstream interior heat exchangers 31 and 32 are made to function as radiators, and the exterior heat exchanger 33 is made to function as a heat absorber.

Specifically, the first flow path switching valve 50 switches the flow paths such that the refrigerant that has flowed out of the downstream interior heat exchanger 31 flows into the upstream interior heat exchanger 32 through the inlet thereof. Meanwhile, the second flow path switching valve 51 switches the flow paths such that the refrigerant that has flowed out of the exterior heat exchanger 33 flows into the accumulator 34. The bypass switching valve 56 switches the flow paths such that the refrigerant flowing through the second main refrigerant pipe 41 flows through only the exterior heat exchanger 33. The first pressure reducing valve 52 is turned into the non-expansion state, and the second pressure reducing valve 53 is turned into the expansion state.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 into the upstream interior heat exchanger 32 via the first branch refrigerant pipe 44. Then, the refrigerant circulates through the upstream interior heat exchanger 32. That is, since the high-temperature refrigerant flows into the downstream and upstream interior heat exchangers 31 and 32, the air-conditioning air is heated by both of the downstream and upstream interior heat exchangers 31 and 32. As a result, a high heating capacity is achieved.

The refrigerant that has circulated through the upstream interior heat exchanger 32 flows through the fourth main refrigerant pipe 43 into the second main refrigerant pipe 41 via the second branch refrigerant pipe 45. The refrigerant flowing into the second main refrigerant pipe 41 expands by passing through the second pressure reducing valve 53, and then flows into the exterior heat exchanger 33. The refrigerant that has flowed into the exterior heat exchanger 33 absorbs heat from the outside air. Then, the refrigerant passes through the third main refrigerant pipe 42 and the third branch refrigerant pipe 46 in this order, and is sucked into the motor-driven compressor 30 by way of the accumulator 34.

Figure 6:
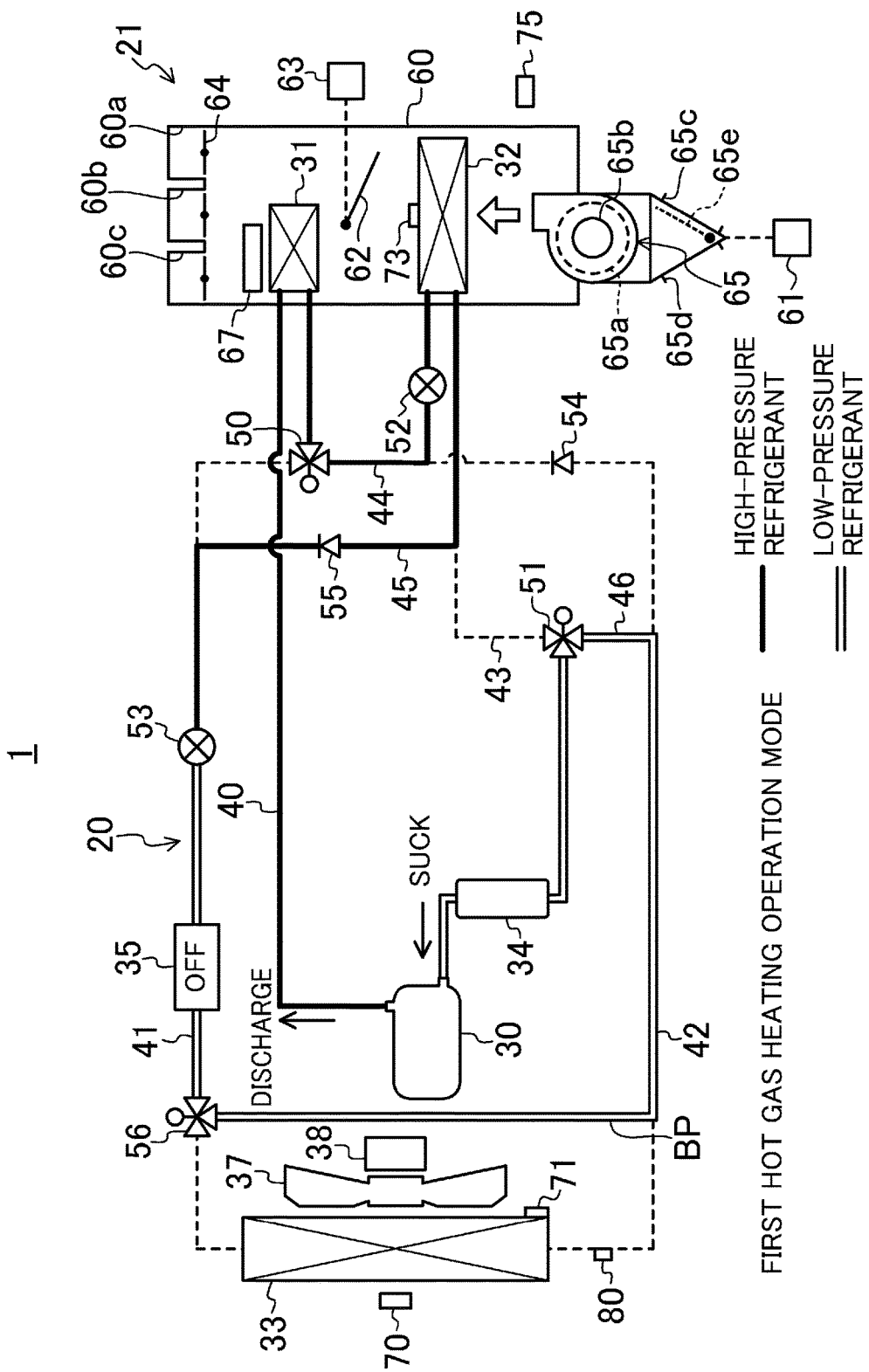
FIG. 6 is a diagram corresponding to FIG. 1 and illustrating how the air conditioner operates in a first hot gas heating operation mode.

The first hot gas heating operation mode shown in FIG. 6 is selected when it is difficult to absorb heat using the exterior heat exchanger 33. In the first hot gas heating operation mode, the downstream and upstream interior heat exchangers 31 and 32 are made to function as radiators. Also, the refrigerant is allowed to flow while bypassing the exterior heat exchanger 33.

Specifically, the first and second flow path switching valves 50 and 51 and the first and second pressure reducing valves 52 and 53 are maintained in the same state as in the normal heating mode. The bypass switching valve 56 switches the flow paths so that the refrigerant flowing through the second main refrigerant pipe 41 flows through only the bypass pipe BP.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows through the second main refrigerant pipe 41 into the upstream interior heat exchanger 32 via the first branch refrigerant pipe 44. Then, the refrigerant circulates through the upstream interior heat exchanger 32. That is, since the refrigerant discharged from the motor-driven compressor 30 flows into the downstream and upstream interior heat exchangers 31 and 32, the air-conditioning air is heated by both of the downstream and upstream interior heat exchangers 31 and 32.

The refrigerant that has circulated through the upstream interior heat exchanger 32 flows through the fourth main refrigerant pipe 43 into the second main refrigerant pipe 41 via the second branch refrigerant pipe 45. The refrigerant that has flowed into the second main refrigerant pipe 41 expands by passing through the second pressure reducing valve 53, flows through the bypass pipe BP, passes through the third main refrigerant pipe 42 and the third branch refrigerant pipe 46 in this order, and then is sucked into the motor-driven compressor 30 by way of the accumulator 34. In this first hot gas heating operation mode, the refrigerant flows while bypassing the exterior heat exchanger 33.

Figure 7:
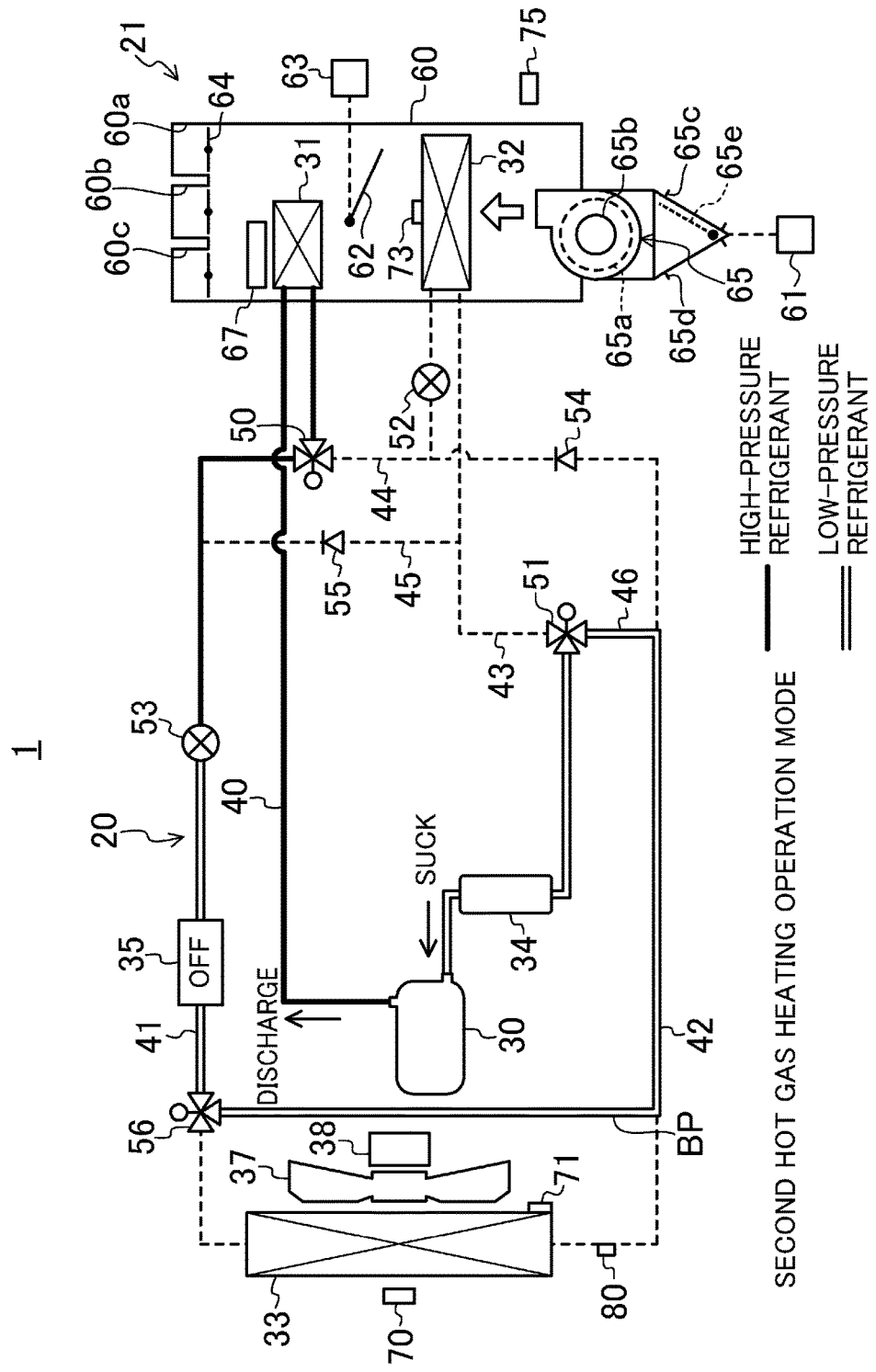
FIG. 7 is a diagram corresponding to FIG. 1 and illustrating how the air conditioner operates in a second hot gas heating operation mode.

The second hot gas heating operation mode shown in FIG. 7 is selected when it is difficult to absorb heat using the exterior heat exchanger 33 and when the heating capacity may be lower than in the first hot gas heating operation mode shown in FIG. 6. In the second hot gas heating operation mode, the downstream interior heat exchanger 31 is made to function as a radiator. Also, the refrigerant is allowed to flow while bypassing the exterior heat exchanger 33 and the upstream interior heat exchanger 32.

Specifically, the first flow path switching valve 50 switches the flow paths so as to prevent the refrigerant that has flowed out of the downstream interior heat exchanger 31 from flowing into the upstream interior heat exchanger 32 through its inlet and allow the refrigerant to flow toward the second pressure reducing valve 53. The second flow path switching valve 51 and the second pressure reducing valve 53 are maintained in the same state as in the normal heating operation mode. The bypass switching valve 56 switches the flow paths so that the refrigerant flowing through the second main refrigerant pipe 41 flows through only the bypass pipe BP.

If the motor-driven compressor 30 is activated in this state, the high-pressure refrigerant discharged from the motor-driven compressor 30 flows into the downstream interior heat exchanger 31 through the first main refrigerant pipe 40, and circulates through the downstream interior heat exchanger 31. The refrigerant that has circulated through the downstream interior heat exchanger 31 flows into the second main refrigerant pipe 41. The refrigerant that has flowed into the second main refrigerant pipe 41 expands by passing through the second pressure reducing valve 53, flows through the bypass pipe BP, passes through the third main refrigerant pipe 42 and the third branch refrigerant pipe 46 in this order, and then is sucked into the motor-driven compressor 30 by way of the accumulator 34. In this mode, the refrigerant discharged from the motor-driven compressor 30 does not flow through the upstream interior heat exchanger 32, and therefore, the heating capacity becomes lower than in the first hot gas heating operation mode shown in FIG. 6.

Figure 8:
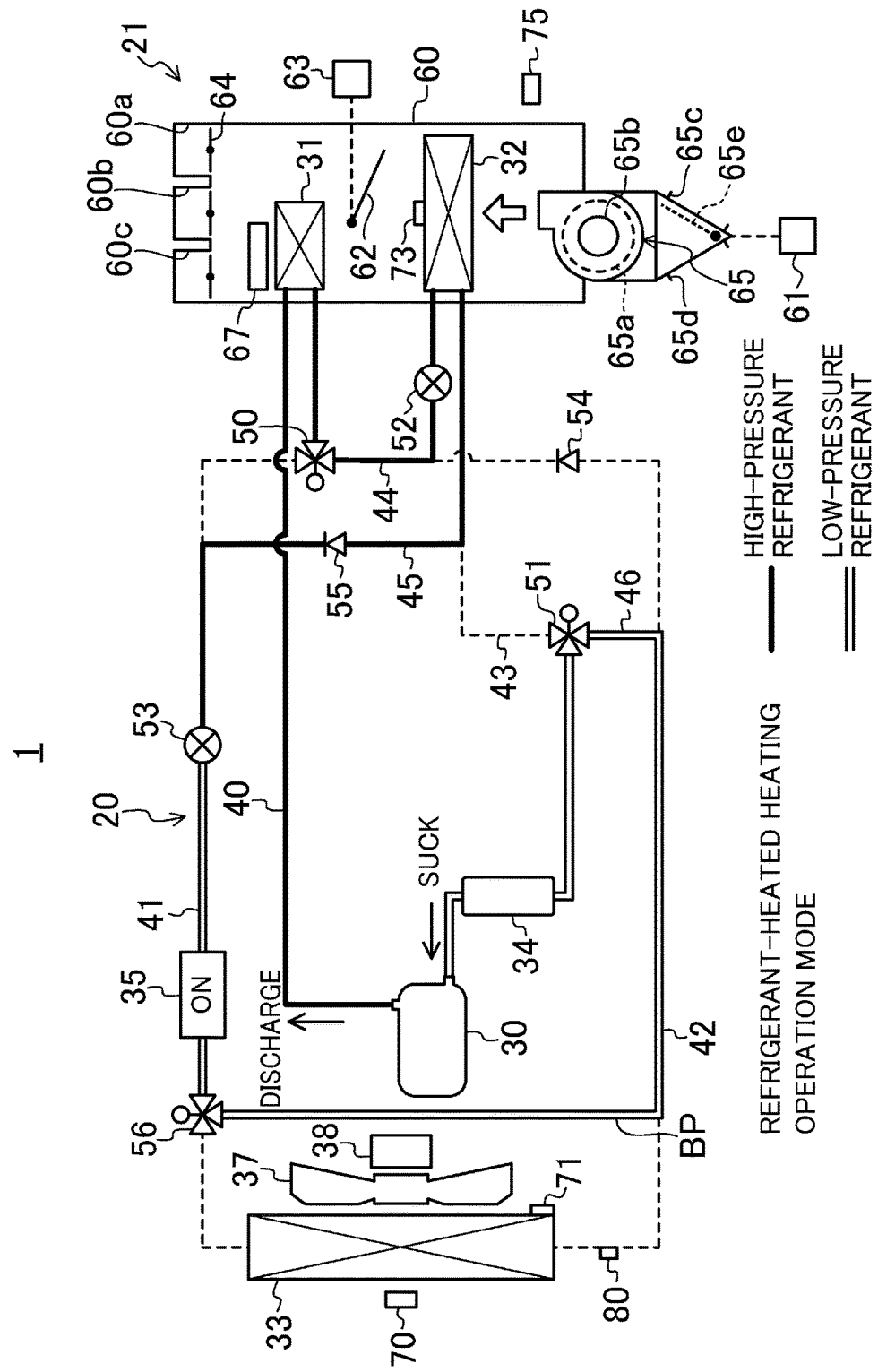
FIG. 8 is a diagram corresponding to FIG. 1 and illustrating how the air conditioner operates in a refrigerant-heated heating operation mode.

The refrigerant-heated heating operation mode shown in FIG. 8 is selected when it is even more difficult to absorb heat using the exterior heat exchanger 33 (i.e., when it is virtually impossible to absorb heat from the outside air). In the refrigerant-heated heating operation mode, the downstream and upstream interior heat exchangers 31 and 32 are made to function as radiators. Also, the refrigerant is allowed to flow while bypassing the exterior heat exchanger 33, and the refrigerant heater 35 is turned ON.

Specifically, the first and second flow path switching valves 50 and 51, the first and second pressure reducing valves 52 and 53, and the bypass switching valve 56 are maintained in the same state as in the first hot gas heating operation mode.

If the motor-driven compressor 30 is activated in this state, the refrigerant discharged from the motor-driven compressor 30 circulates through the downstream interior heat exchanger 31 and the upstream interior heat exchanger 32 in this order, passes through the fourth main refrigerant pipe 43 and the second branch refrigerant pipe 45 and flows into the second main refrigerant pipe 41. The refrigerant that has flowed into the second main refrigerant pipe 41 expands by passing through the second pressure reducing valve 53 and then is heated by the refrigerant heater 35. Thereafter, the refrigerant flows through the bypass pipe BP, passes through the third main refrigerant pipe 42 and the third branch refrigerant pipe 46 in this order, and then is sucked into the motor-driven compressor 30 via the accumulator 34.

Figure 9:
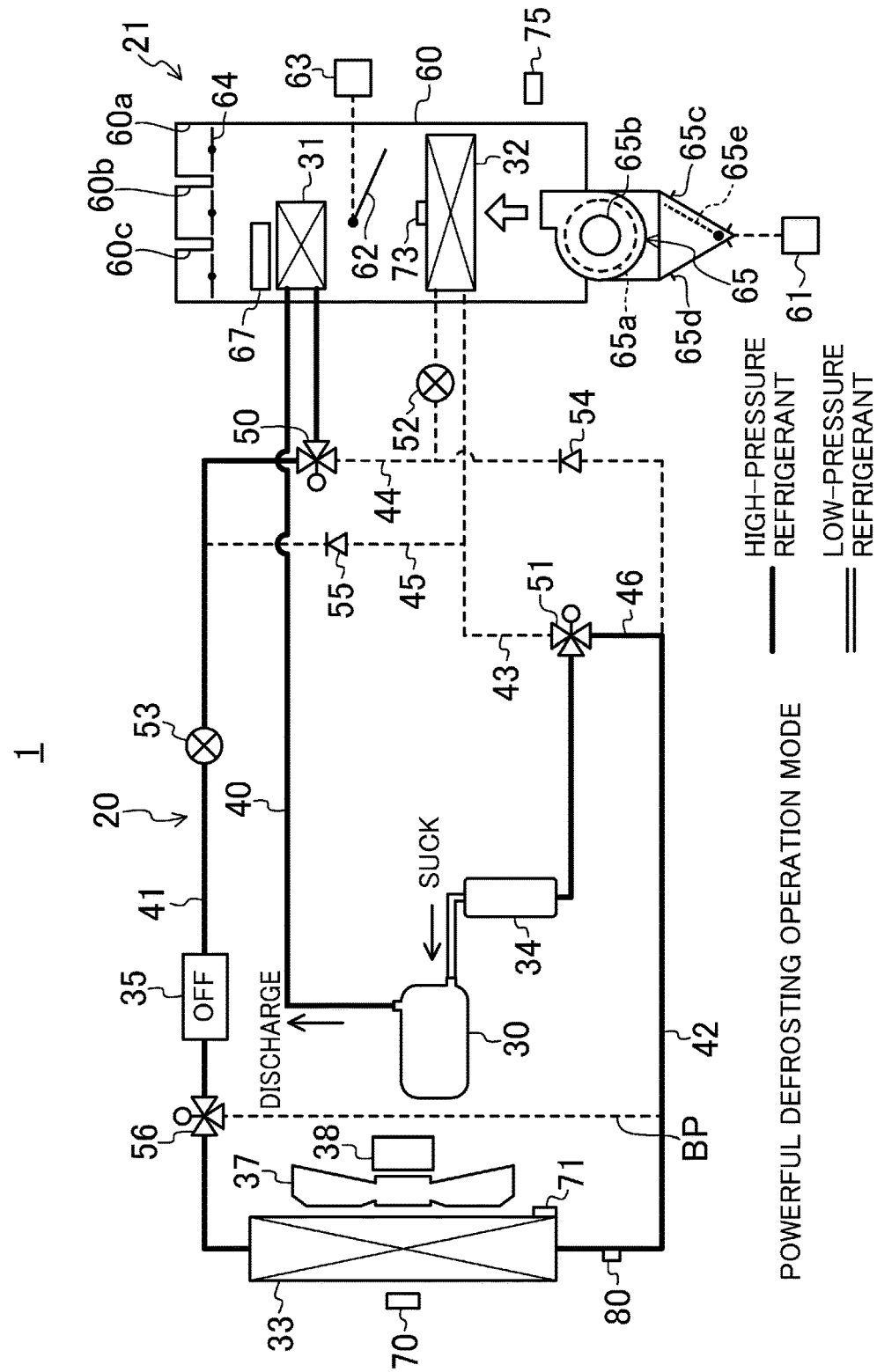
FIG. 9 is a diagram corresponding to FIG. 1 and illustrating how the air conditioner operates in a powerful defrosting operation mode.

The powerful defrosting operation mode shown in FIG. 9 is selected in order to melt frost deposited, if any, in the exterior heat exchanger 33 during heating. In the powerful defrosting operation mode, the downstream interior heat exchanger 31 and the exterior heat exchanger 33 are made to function as radiators, and the refrigerant is allowed to flow while bypassing the upstream interior heat exchanger 32.

Specifically, the first flow path switching valve 50 switches the flow paths so as to prevent the refrigerant that has flowed out of the downstream interior heat exchanger 31 from flowing into the upstream interior heat exchanger 32 through its inlet and to allow the refrigerant to flow toward the second pressure reducing valve 53. Meanwhile, the second flow path switching valve 51 switches the flow paths so as to allow the refrigerant that has flowed out of the exterior heat exchanger 33 to flow into the accumulator 34. The bypass switching valve 56 switches the flow paths so that the refrigerant flowing through the second main refrigerant pipe 41 flows through only the exterior heat exchanger 33. The second pressure reducing valve 53 is turned into the non-expansion state.

If the motor-driven compressor 30 is activated in this state, the refrigerant discharged from the motor-driven compressor 30 circulates through the downstream interior heat exchanger 31, and then flows into the exterior heat exchanger 33 without expanding by passing through the second main refrigerant pipe 41. The refrigerant that has flowed into the exterior heat exchanger 33 dissipates heat to melt the frost there. Thereafter, the refrigerant passes through the third main refrigerant pipe 42 and the third branch refrigerant pipe 46 in this order and then is sucked into the motor-driven compressor 30 via the accumulator 34.

Figure 10:
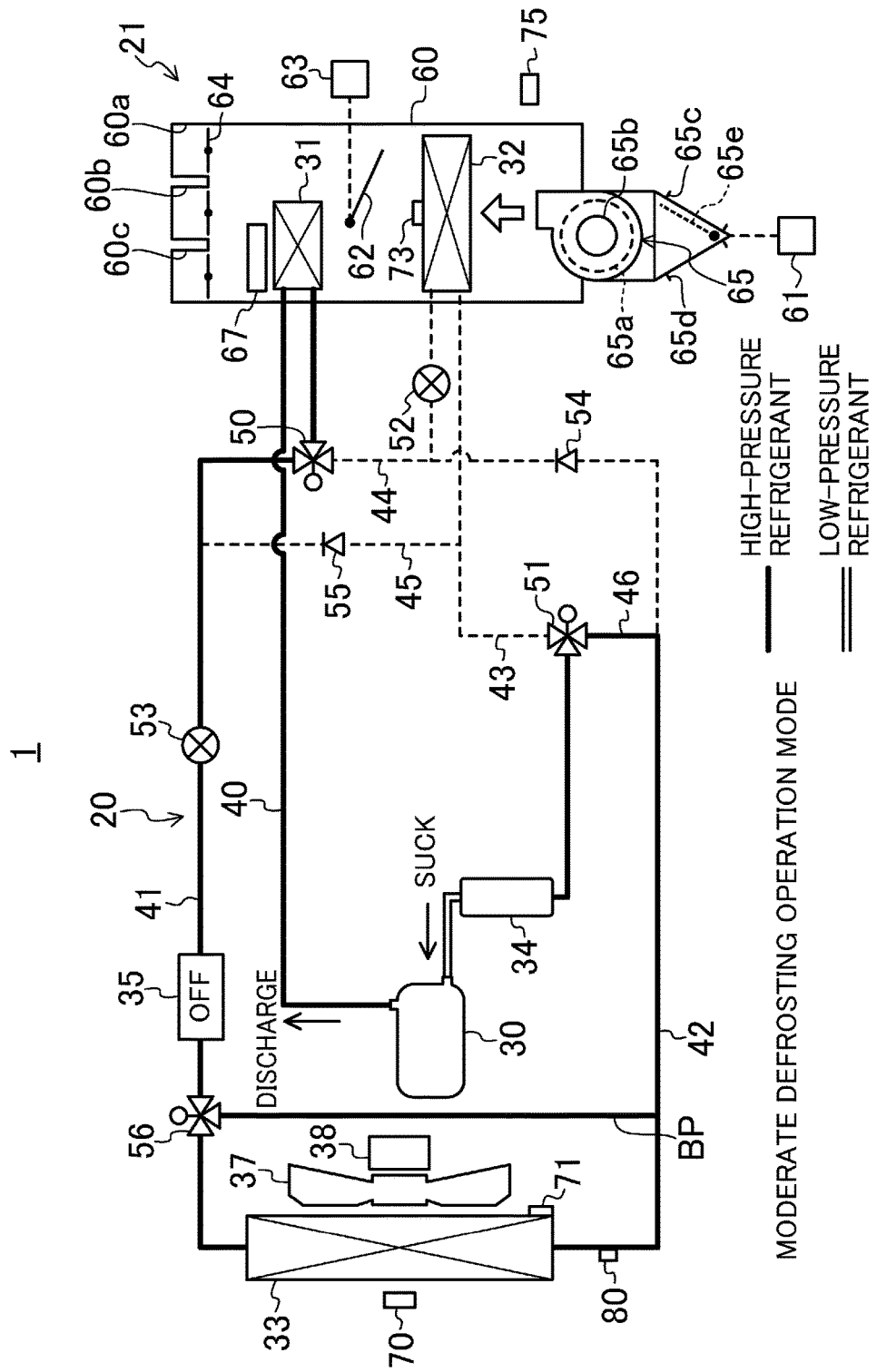
FIG. 10 is a diagram corresponding to FIG. 1 and illustrating how the air conditioner operates in a moderate defrosting operation mode.

The moderate defrosting operation mode shown in FIG. 10 is selected in order to melt frost deposited, if any, in the exterior heat exchanger 33 during heating, and has its defrosting capacity set to be lower than in the powerful defrosting operation mode shown in FIG. 9. In the moderate defrosting operation mode, the downstream interior heat exchanger 31 and the exterior heat exchanger 33 are made to function as radiators, and part of the refrigerant is allowed to flow through the bypass pipe BP. Also, the refrigerant is made to bypass the upstream interior heat exchanger 32.

Specifically, the first and second flow path switching valves 50 and 51 and the first and second pressure reducing valves 52 and 53 are maintained in the same state as in the powerful defrosting operation mode. The bypass switching valve 56 switches the flow paths such that the refrigerant flowing through the second main refrigerant pipe 41 flows through both of the exterior heat exchanger 33 and the bypass pipe BP.

If the motor-driven compressor 30 is activated in this state, the refrigerant discharged from the motor-driven compressor 30 circulates through the downstream interior heat exchanger 31, and then flows into the exterior heat exchanger 33 and the bypass pipe BP without expanding by passing through the second main refrigerant pipe 41. The refrigerant that has flowed into the exterior heat exchanger 33 dissipates heat to melt the frost there, while the refrigerant that has flowed into the bypass pipe BP flows into the third main refrigerant pipe 42 almost without dissipating heat. The refrigerant that has flowed into the exterior heat exchanger 33 and the refrigerant that has flowed through the bypass pipe BP are confluent with each other in the third main refrigerant pipe 42. The confluent refrigerant passes through the third branch refrigerant pipe 46 and then is sucked into the motor-driven compressor 30 via the accumulator 34. Since some of the refrigerant flowing through the second main refrigerant pipe 41 flows through the bypass pipe BP, the defrosting capacity becomes lower than in the powerful defrosting operation mode.

Figure 11:
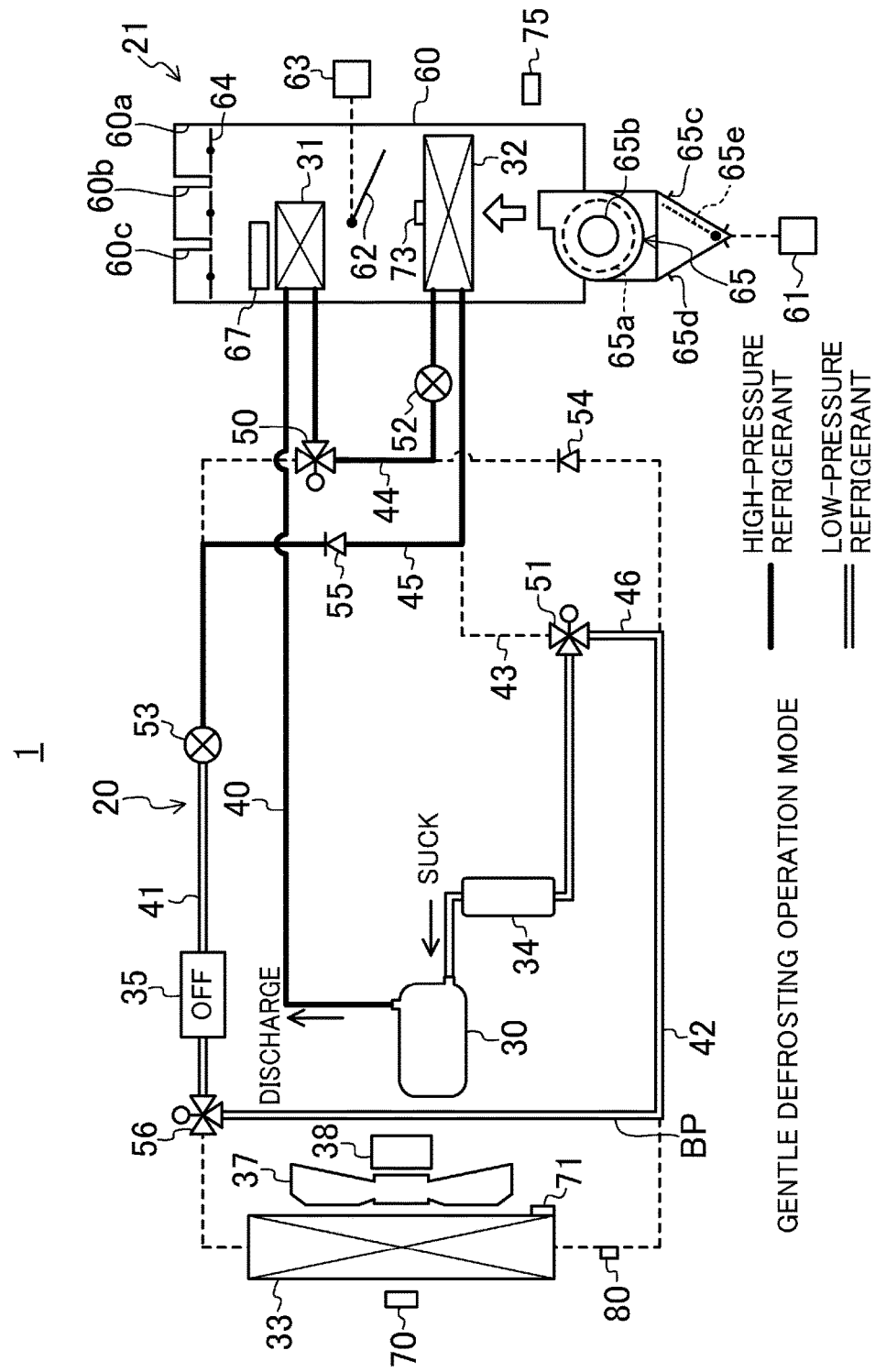
FIG. 11 is a diagram corresponding to FIG. 1 and illustrating how the air conditioner operates in a gentle defrosting operation mode.

The gentle defrosting operation mode shown in FIG. 11 is selected in order to melt frost deposited, if any, in the exterior heat exchanger 33 while a heating operation is being performed when the outside air temperature is relatively high (e.g., higher than 0° C.), and has its defrosting capacity set to be lower than in the moderate defrosting operation mode shown in FIG. 10. In the gentle defrosting operation mode, the downstream and upstream interior heat exchanger 31 and 32 are made to function as radiators, and the refrigerant is made to bypass the exterior heat exchanger 33.

Specifically, the first and second flow path switching valves 50 and 51, the first and second pressure reducing valves 52 and 53, and the bypass switching valve 56 are maintained in the same state as in the first hot gas heating operation mode.

If the motor-driven compressor 30 is activated in this state, the high-pressure refrigerant discharged from the motor-driven compressor 30 circulates through the downstream and upstream interior heat exchangers 31 and 32 in this order. The air-conditioning air is heated by both of the downstream and upstream interior heat exchangers 31 and 32. Thus, the heating capacity becomes higher in this mode than in the powerful defrosting operation mode and the moderate defrosting operation mode.

The refrigerant that has circulated through the upstream interior heat exchanger 32 passes through the fourth main refrigerant pipe 43 and the second branch refrigerant pipe 45 and flows into the second main refrigerant pipe 41. The refrigerant that has flowed into the second main refrigerant pipe 41 expands by passing through the second pressure reducing valve 53, flows through the bypass pipe BP, passes through the third main refrigerant pipe 42 and the third branch refrigerant pipe 46 in this order, and then is sucked into the motor-driven compressor 30 via the accumulator 34. Although no refrigerant flows through the exterior heat exchanger 33, the frost still melts by absorbing heat from the wind blowing against the vehicle traveling and from the surrounding air, because this gentle defrosting operation mode is selected when the outside air temperature is relatively high.

Figure 12:
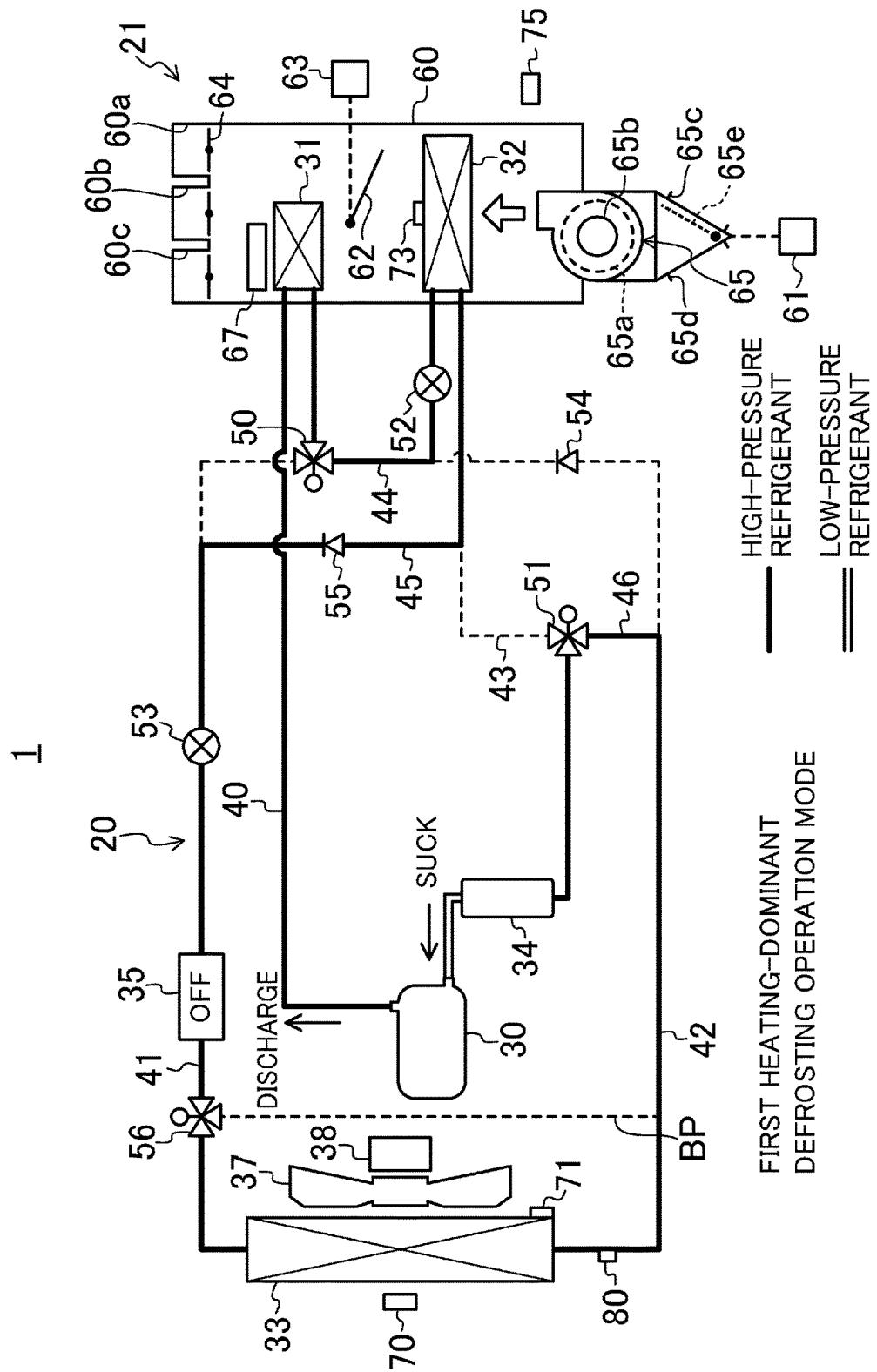
FIG. 12 is a diagram corresponding to FIG. 1 and illustrating how the air conditioner operates in a first heating-dominant defrosting operation mode.

The first heating-dominant defrosting operation mode shown in FIG. 12 is selected in order to melt frost deposited, if any, in the exterior heat exchanger 33 during heating while performing a heating operation with at least a predetermined capacity. In the first heating-dominant defrosting operation mode, the downstream and upstream interior heat exchangers 31 and 32 and the exterior heat exchanger 33 are all made to function as radiators.

Specifically, the first and second flow path switching valves 50 and 51, the first pressure reducing valve 52, and the bypass switching valve 56 are maintained in the same state as in the normal heating operation mode. The second pressure reducing valve 53 is turned into the non-expansion state.

If the motor-driven compressor 30 is activated in this state, the high-pressure refrigerant discharged from the motor-driven compressor 30 circulates through the downstream and upstream interior heat exchangers 31 and 32 in this order. The air-conditioning air is heated by both of the downstream and upstream interior heat exchangers 31 and 32. Thus, the heating capacity increases.

The refrigerant that has circulated through the upstream interior heat exchanger 32 passes through the fourth main refrigerant pipe 43 and the second branch refrigerant pipe 45 to flow into the second main refrigerant pipe 41. The refrigerant that has flowed into the second main refrigerant pipe 41 flows into the exterior heat exchanger 33 without expanding. Thus, the frost deposited in the exterior heat exchanger 33 melts.

Figure 13:
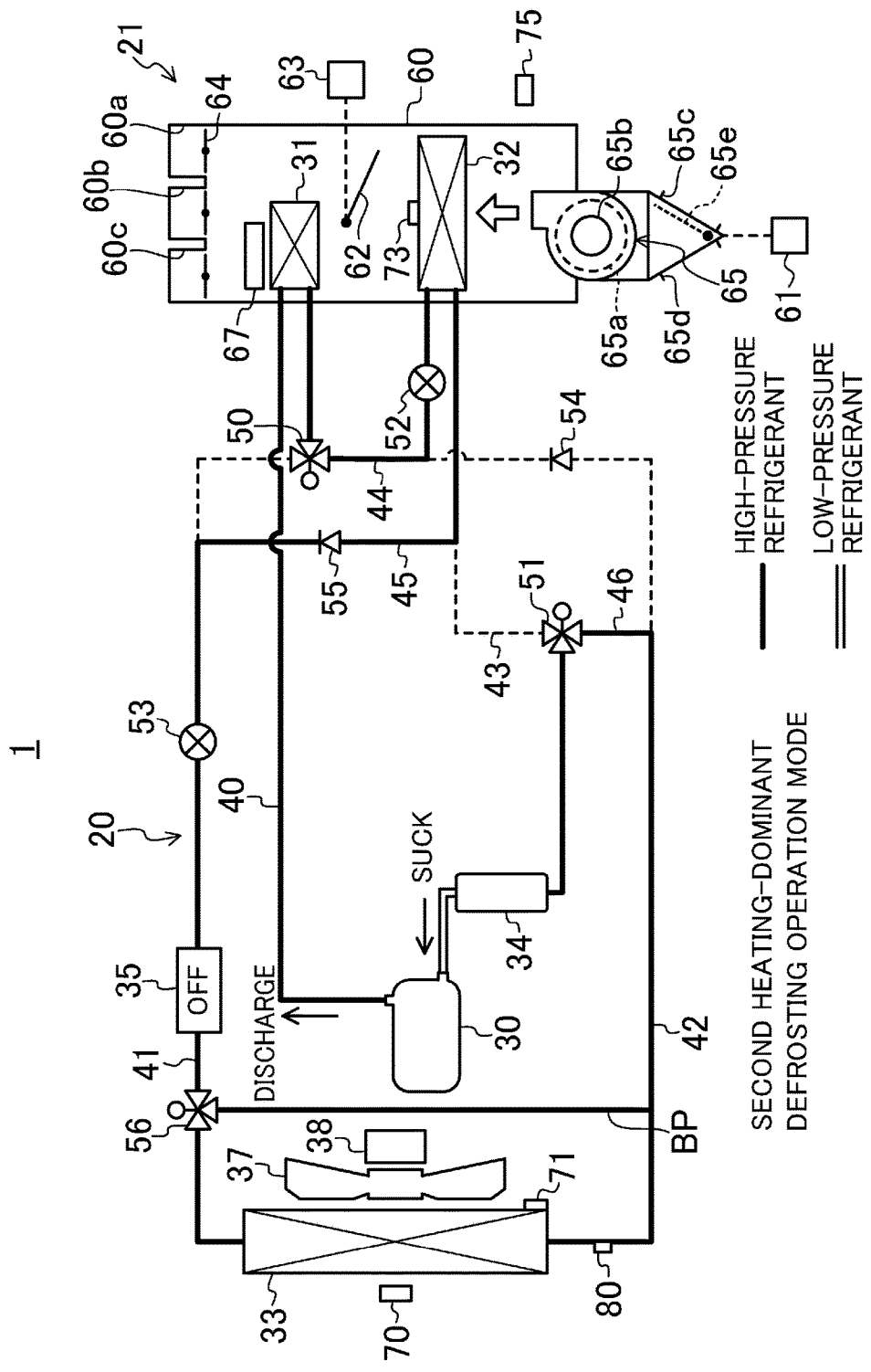
FIG. 13 is a diagram corresponding to FIG. 1 and illustrating how the air conditioner operates in a second heating-dominant defrosting operation mode.

The second heating-dominant defrosting operation mode shown in FIG. 13 is selected in order to melt frost deposited, if any, in the exterior heat exchanger 33 during heating while performing a heating operation with at least a predetermined capacity. The heating capacity is set to be lower in this mode than in the first heating-dominant defrosting operation mode. In the second heating-dominant defrosting operation mode, the downstream and upstream interior heat exchangers 31 and 32 and the exterior heat exchanger 33 are all made to function as radiators, and some of the refrigerant flowing through the second main refrigerant pipe 41 is made to flow through the bypass pipe BP.

Specifically, the first and second flow path switching valves 50 and 51, and the first and second pressure reducing valves 52 and 53 are maintained in the same state as in the first heating-dominant defrosting operation mode. The bypass switching valve 56 switches the flow paths such that the refrigerant flowing through the second main refrigerant pipe 41 passes through both of the exterior heat exchanger 33 and the bypass pipe BP.

If the motor-driven compressor 30 is activated in this state, the high-pressure refrigerant discharged from the motor-driven compressor 30 circulates through the downstream and upstream interior heat exchangers 31 and 32 in this order. The air-conditioning air is heated by both of the downstream and upstream interior heat exchangers 31 and 32.

The refrigerant that has circulated through the upstream interior heat exchanger 32 passes through the fourth main refrigerant pipe 43 and the second branch refrigerant pipe 45 to flow into the second main refrigerant pipe 41. The refrigerant that has flowed into the second main refrigerant pipe 41 flows into the exterior heat exchanger 33 and the bypass pipe BP without expanding. Thus, the frost is melted by the refrigerant that has flowed into the exterior heat exchanger 33. Since not all of the refrigerant is allowed to flow through the exterior heat exchanger 33, the heating capacity becomes higher than in the first heating-dominant defrosting operation mode.

As shown in FIG. 2, the air-conditioning controller 22 includes a frosting detecting section (frosting detecting means) 22a which determines whether or not frost has been deposited in the exterior heat exchanger 33 and how much frost has been deposited there, if any. The frosting detecting section 22a decides that frost has been deposited there if a value obtained by subtracting the surface temperature of the exterior heat exchanger 33 detected by the exterior heat exchanger temperature sensor 71 from the outside air temperature (TG) detected by the outside air temperature sensor 70 is greater than, e.g., 20 (° C.). That is, frosting is detected based on the fact that if frost has been deposited in the exterior heat exchanger 33, the refrigerant cannot absorb heat in the exterior heat exchanger 33 and its temperature does not rise. Thus, the value of "20" may be changed into any other value as long as a determination can be made, based on that value, whether or not frost has been deposited in the exterior heat exchanger 33. Alternatively, deposition of frost may be detected directly. Meanwhile, the amount of frost deposited may be detected based on the difference between the outside air temperature (TG) detected by the outside air temperature sensor 70 and the temperature detected by the exterior heat exchanger temperature sensor 71. The greater the difference between these temperatures, the larger the amount of frost deposited is regarded to be.

The frosting detecting section 22a also functions as a decrease-in-quantity-of-heat-absorbed detecting means for determining whether or not the quantity of heat absorbed by the exterior heat exchanger 33 has decreased during heating. As described above, if frost is deposited in the exterior heat exchanger 33, the quantity of heat absorbed from the outside air decreases. However, since there is a correlation between the amount of frost deposited and such a decrease in the quantity of heat absorbed, the decrease in the quantity of heat absorbed by the exterior heat exchanger 33 may be detected by the frosting detecting section 22a. That is to say, the magnitude of the decrease in the quantity of heat absorbed by the exterior heat exchanger 33 may be detected based on the amount of frost deposited in the exterior heat exchanger 33.

In this embodiment, the frosting detecting section 22a is configured to determine whether or not the amount of frost deposited in the exterior heat exchanger 33 is equal to or smaller than a first predetermined value and whether the amount of frost deposited there is equal to or smaller than a second predetermined value that is less than the first predetermined value. The first predetermined value is set to be such a value at which it is too difficult to absorb heat using the exterior heat exchanger to avoid a significant decline in heating capacity. On the other hand, the second predetermined value is set to be such a value at which it is almost impossible to absorb heat using the exterior heat exchanger 33 and no heating operation can be performed.

The magnitude of decrease in the quantity of heat absorbed by the exterior heat exchanger 33 may be detected either by the frosting detecting section 22a described above or based on an outside air temperature sensor 70 as will be described later with reference to a flowchart. In the latter case, the outside air temperature sensor 70 functions as the decrease-in-quality-of-heat-absorbed detecting means. Specifically, if the outside air temperature is equal to or lower than −15° C. (which may be a first predetermined value), the decision is made that it is so difficult to absorb heat using the exterior heat exchanger 33 that the heating capacity has decreased significantly. On the other hand, if the outside air temperature is equal to or lower than −20° C. (which may be a second predetermined value), then the decision is made that it is almost impossible to absorb heat using the exterior heat exchanger 33 and no heating operation can be performed.

The air-conditioning controller 22 further includes a degree-of-heating-requested detecting section 22b, which is provided to detect what degree of heating is requested when a heating operation is going to be started. In detecting the degree of heating requested, the target temperature of the air-conditioning air blowing out of the interior air-conditioning unit 21 is compared to the real temperature of the air actually blowing out, and the decision is made that the lower the real temperature, the higher the degree of heating requested should be and that the closer the real and target temperatures are, the lower the degree of heating requested should be. In this case, the target temperature is calculated by the air-conditioning controller 22 based on the temperature setting by the occupant and the outside air temperature, for example. Meanwhile, the real temperature may be obtained by having the temperature of the air-conditioning air in the vicinity of the blowout port measured by the temperature sensor, for example. Or the decision may also be made that the higher the occupant's temperature setting, the higher the degree of heating requested should be.

Next, the procedure of control to be performed by the air-conditioning controller 22 will be described. Although not shown, in the main routine, if the outside air temperature (TG) detected by the outside air temperature sensor 70 is lower than 0° C., the operation modes of the heat pump device 20 are switched into a heating operation mode. In the heating operation mode, a heat mode is mostly selected as the blowout mode of the interior air-conditioning unit 21. Also, the air-mix door 62 is operated so that the temperature of the blown air becomes as high as the target temperature. Examples of the heating operation modes include the normal heating operation mode, the first hot gas heating operation mode, the second hot gas heating operation mode, and the refrigerant-heated heating operation mode.

If the outside air temperature (TG) is within the range of 0° C. to 25° C., the air-conditioning controller 22 allows for performing heating while dehumidifying. However, if the outside air temperature (TG) is higher than 25° C., then the operation modes of the heat pump device 20 are switched into the cooling operation mode.

Figure 14:
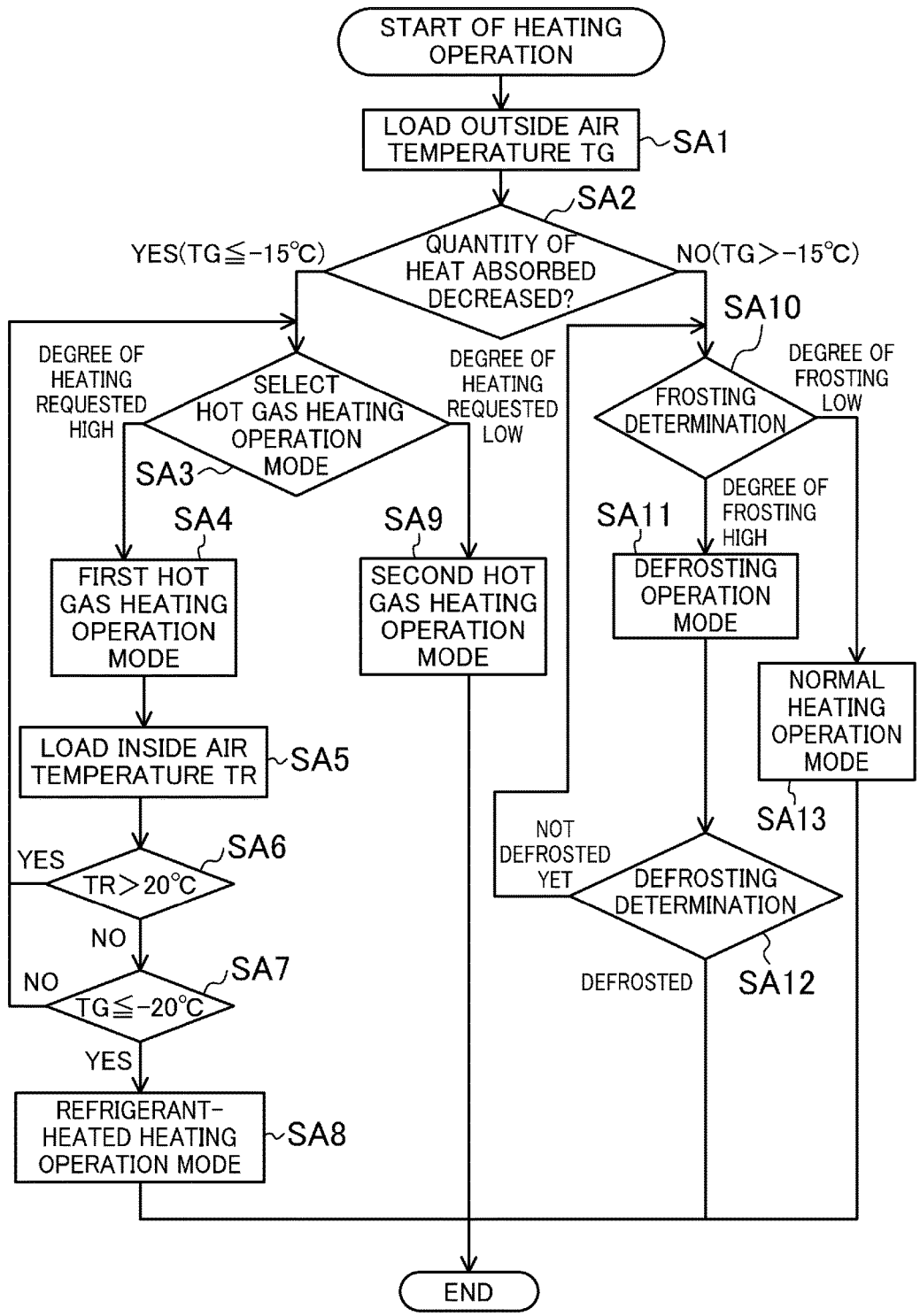
FIG. 14 is flowchart showing how to perform a heating operation subroutine control.

If a heating operation mode has been selected in the main routine, the heating operation subroutine control shown in FIG. 14 is performed. In performing the heating operation subroutine control, first, in Step SA1, the outside air temperature TG detected by the outside air temperature sensor 70 is loaded with the refrigerant heater 35 turned OFF. Next, the process proceeds to Step SA2 to determine whether or not the quantity of heat absorbed by the exterior heat exchanger 33 has decreased. In this embodiment, the quantity of heat absorbed by the exterior heat exchanger 33 is detected by the outside air temperature sensor 70. If the outside air temperature is equal to or lower than −15° C. (which may be a first predetermined value), the quantity of heat absorbed by the exterior heat exchanger 33 has decreased so much that the heating capacity maintained by absorbing heat from the outside air would deteriorate significantly. That is why in that case, the process proceeds to Step SA3 to perform a hot gas heating operation mode selection processing.

Note that the determination may be made by the frosting detecting section 22a whether or not the quantity of heat absorbed by the exterior heat exchanger 33 has decreased. In that case, in Step SA2, the determination is made based on the amount of frost deposited in the exterior heat exchanger 33.

In Step SA3, first of all, the degree-of-heating-requested detecting section 22b determines whether the degree of heating requested is high or low. If the degree of heating requested turns out to be high, the process proceeds to Step SA4 to switch the operation modes of the heat pump device 20 into the first hot gas heating operation mode. As a result, a heating operation may be performed without absorbing heat from the outside air.

Next, the process proceeds to Step SA5 to load the inside air temperature TR that has been detected by the inside air temperature sensor 75. Subsequently, in Step SA6, a determination is made whether the inside air temperature TR is higher than 20° C. If the inside air temperature TR is higher than 20° C., it means that the air in the vehicle cabin has already been conditioned and heated to a sufficient degree. Thus, in that case, the process goes back to Step SA3 to select a hot gas heating operation mode again based on the degree of heating requested.

On the other hand, if the inside air temperature TR has turned out in Step SA6 to be lower than 20° C., then the process proceeds to Step SA7 to determine whether or not the outside air temperature TG is equal to or lower than −20° C. If the decision made been made in Step SA7 that the outside air temperature TG is equal to or lower than −20° C., it means that it is almost impossible to absorb heat using the exterior heat exchanger 33 and no heating can be performed by absorbing heat from the outside air. Thus, in that case, the process proceeds to Step SA8 to turn the refrigerant heater 35 ON and switch the operation modes of the heat pump device 20 into the refrigerant-heated heating operation mode, and then the process proceeds to END.

On the other hand, if the decision has been made in Step SA7 that the outside air temperature TG is higher than −20° C., then heat can still be absorbed a little from the outside air, and the process goes back to Step SA3 with the refrigerant heater 35 kept OFF.

If the degree of heating requested has turned out to be low in Step SA3 of selecting the hot gas heating operation mode, then the process proceeds to Step SA9 to switch the operation modes of the heat pump device 20 into the second hot gas heating operation mode, and then the process proceeds to END.

On the other hand, if the answer to the query of the processing step SA2 is NO and if the outside air temperature TG is higher than −15° C., then heating may be performed by absorbing heat from the outside air without performing a hot gas heating operation. In that case, first of all, the process proceeds to Step SA10 to make a frosting determination. This frosting determination is made based on the degree of frosting in the exterior heat exchanger 33 that has been detected by the frosting detecting section 22a to determine whether the degree of frosting in the exterior heat exchanger 33 is high or low. If the degree of frosting in the exterior heat exchanger 33 has turned out to be high in Step SA10, then the process proceeds to Step SA11 to switch the operation modes of the heat pump device 20 into the defrosting operation mode. This defrosting operation mode will be described later.

After the air conditioner has operated in the defrosting operation mode, the process proceeds to Step SA12 to make a defrosting determination. The defrosting determination may be made by the frosting detecting section 22a to determine whether the frost in the exterior heat exchanger 33 has melted yet. If the decision has been made in Step SA12 that the exterior heat exchanger 33 has already been defrosted, the process proceeds to END. On the other hand, if the decision has been made in Step SA12 that the exterior heat exchanger 33 has not been defrosted yet, then the process goes back to Step SA10.

On the other hand, if the decision has been made in Step SA10 that the degree of frosting is low, then a switch is made into the normal heating operation mode.

Figure 15:
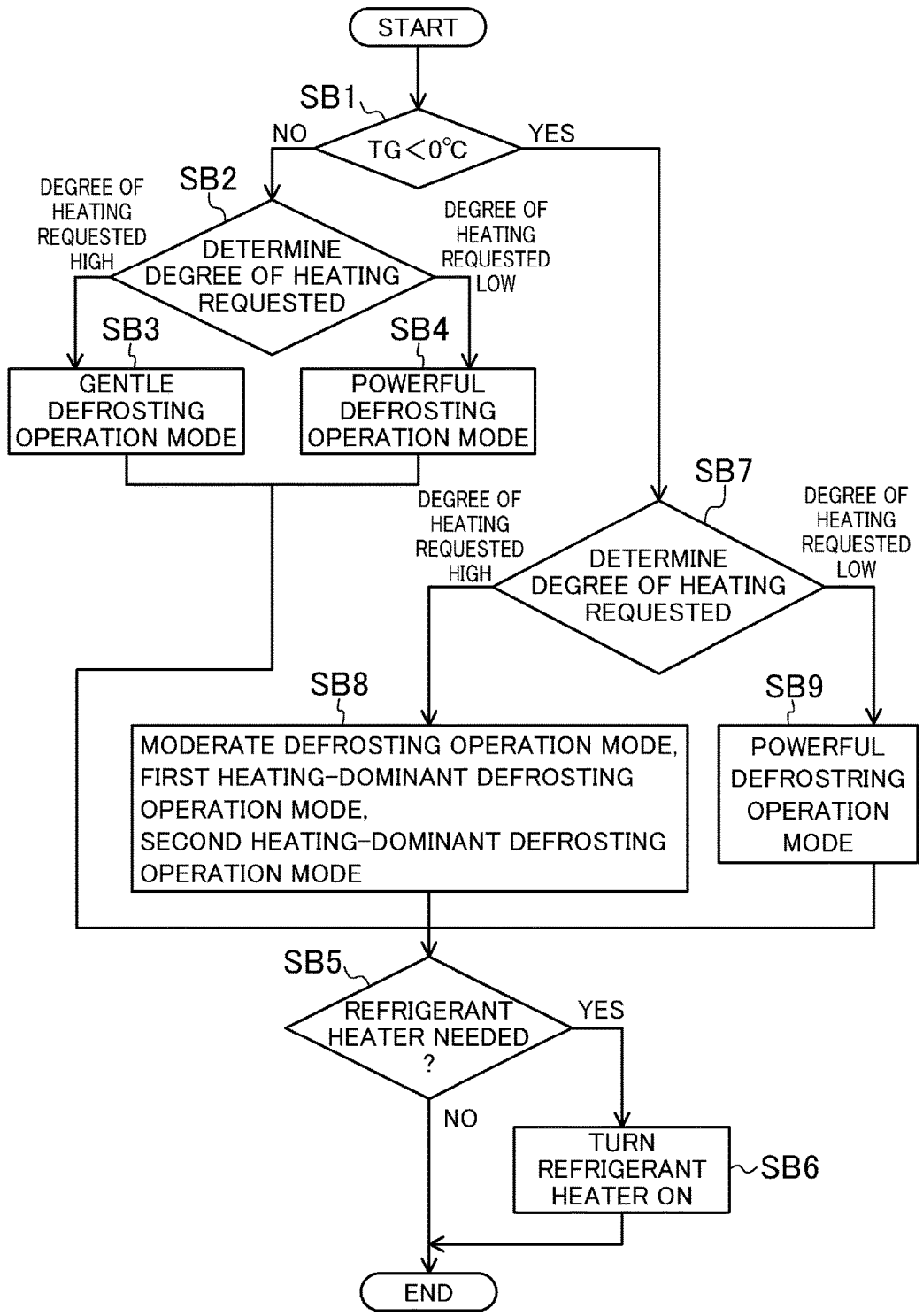
FIG. 15 is flowchart showing how to perform a defrosting operation subroutine control.

The heating operation subroutine control is performed as described above. If the operation modes have been switched in Step SA11 into the defrosting operation mode, then the subroutine control shown in FIG. 15 is performed. In Step SB1 of the flowchart shown in FIG. 15, a determination is made whether or not the outside air temperature TG detected by the outside air temperature sensor 70 is lower than 0° C. If the answer to the query of the processing step SB1 is NO (i.e., if the outside air temperature TG is equal to or higher than 0° C.), the process proceeds to Step SB2 to determine the degree of heating requested. That is to say, the degree-of-heating-requested detecting section 22b determines whether the degree of heating requested is high or low. If the degree of heating requested has turned out to be high, the process proceeds to Step SB3 to switch the operation modes of the heat pump device 20 into the gentle defrosting operation mode. In the gentle defrosting operation mode, no refrigerant flows through the exterior heat exchanger 33, but the frost in the exterior heat exchanger 33 can still be melted by absorbing heat from the outside air, because the outside air temperature is higher than 0° C. On the other hand, if the degree of heating requested has turned out to be low in Step SB2, the process proceeds to Step SB4 to switch the operation modes of the heat pump device 20 into the powerful defrosting operation mode. Although the heating capacity is lower in the powerful defrosting operation mode than in the gentle defrosting operation mode, the occupant's comfortableness is not affected, because the degree of heating requested is low.

Thereafter, the process proceeds to Step SB5 to determine whether or not the refrigerant heater 35 is needed. This determination may be made by the degree-of-heating-requested detecting section 22b. If the decision has been made by the degree-of-heating-requested detecting section 22b that an even higher degree of heating is now requested, the process proceeds to Step SB6 to turn the refrigerant heater 35 ON and then proceeds to END. On the other hand, if the degree-of-heating-requested detecting section 22b has not found the degree of heating requested so high, the process proceeds to END. Optionally, this processing step SB2 may be omitted. In that case, if the outside air temperature has turned out in Step SB1 to be equal to or higher than 0° C., then a switch will be made into the gentle defrosting operation mode.

On the other hand, if the answer to the query of the processing step SB1 is YES (i.e., if the outside air temperature TG is less than 0° C.), then the process proceeds to Step SB7 to determine the degree of heating requested in the same way as in Step SB2. If the degree of heating requested has turned out to be high in Step SB7, then the process proceeds to Step SB8 to switch, according to the degree of heating requested, the operation modes of the heat pump device 20 into a mode selected from the group consisting of the moderate defrosting operation mode, the first heating-dominant defrosting operation mode, and the second heating-dominant defrosting operation mode. If the decision has been made that the degree of heating requested is even higher, then the operation modes are switched into the first or second heating-dominant defrosting operation mode. On the other hand, if the degree of heating requested has turned out to be low in Step SB7, then the process proceeds to Step SB9 to switch the operation modes of the heat pump device 20 into the powerful defrosting operation mode. Then, the process proceeds to END by way of Step SB5.

Figure 16:
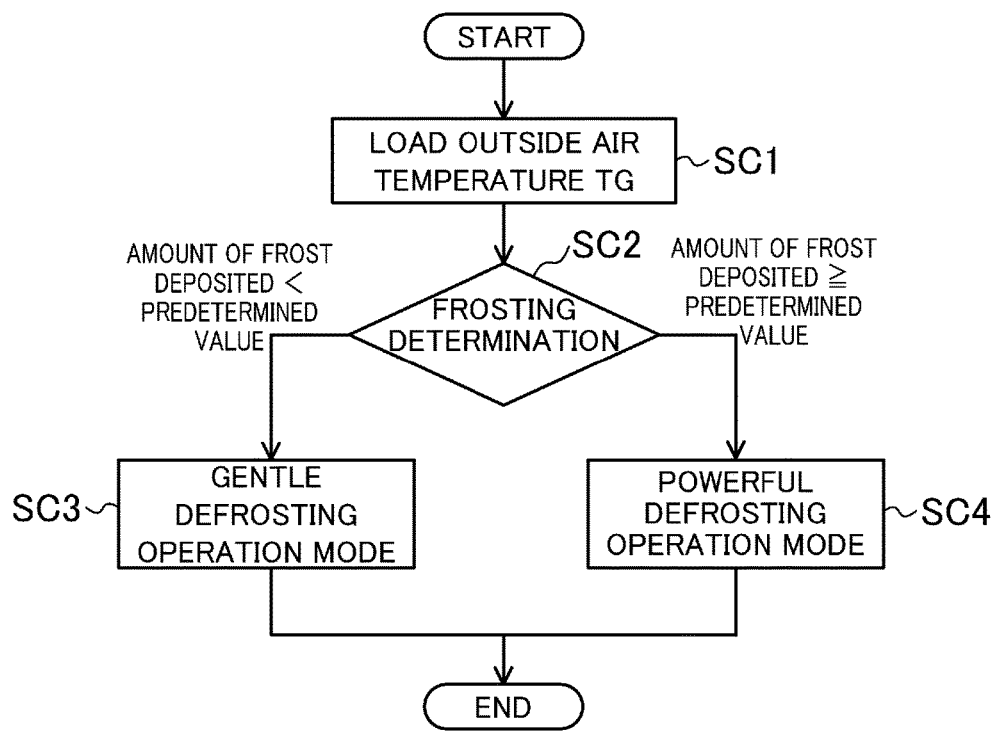
FIG. 16 is a flowchart showing how to perform a control of selecting a defrosting operation mode according to the amount of frost deposited.

Optionally, in Step SA11 of the flowchart shown in FIG. 14, the switch between the gentle and powerful defrosting operation modes may be controlled in the defrosting operation mode based on the flowchart shown in FIG. 16. In Step SC1 of this flowchart, the outside air temperature TG detected by the outside air temperature sensor 70 is loaded. Next, the process proceeds to Step SC2 to make a frosting determination. The frosting determination may be made by the frosting detecting section 22a to determine whether the amount of frost deposited is less than, or equal to or greater than, a predetermined amount. If the amount of frost deposited has turned out to be less than the predetermined amount, the process proceeds to Step SC3 to switch the operation modes of the heat pump device 20 into the gentle defrosting operation mode. On the other hand, if the amount of frost deposited is equal to or greater than the predetermined amount, the process proceeds to Step SC4 to switch the operation modes of the heat pump device 20 into the powerful defrosting operation mode. That is to say, if the amount of frost deposited is less than the predetermined amount, it means that the amount of frost deposited is small enough to be easily melted even in the gentle defrosting operation mode. Meanwhile, the amount of frost deposited that is equal to or greater than the predetermined amount is too large an amount of frost to be sufficiently melted in the gentle defrosting operation mode.

Optionally, the air-conditioning controller 22 may be configured to select a hot gas heating operation mode based on the quality of wet vapor of the refrigerant that has been detected by the quality-of-wet-vapor detecting sensor 80. That is to say, either the powerful defrosting operation mode or the gentle defrosting operation mode is selected to prevent the motor-driven compressor 30 from operating in a wet condition.

Also, if the charge level of the traction battery B detected by the battery level detecting sensor 81 is equal to or smaller than a predetermined value, the air-conditioning controller 22 may prohibit the refrigerant heater 35 from being activated. For example, the "predetermined value" may be a charge level of 30% of the battery's full capacity.

Furthermore, the air-conditioning controller 22 may also be configured to allow the refrigerant heater 35 to be activated if it has been detected that the air needs heating and that the traction battery B is now being charged by the charging state detecting sensor 82.

Alternatively, the air-conditioning controller 22 may determine, in Step SA6, whether or not the air condition in the vehicle cabin is good enough to meet the degree of heating requested detected by the degree-of-heating-requested detecting section 22b. If the decision has been made that the air condition in the vehicle cabin is not good enough to meet the degree of heating requested, then the refrigerant heater 35 may be activated in Step SA8.

Still alternatively, the air-conditioning controller 22 may activate the heat pump device 20 so that the first hot gas heating operation mode is selected at the beginning of heating if it is difficult to absorb heat from the outside air.

Yet alternatively, the air-conditioning controller 22 may control the second pressure reducing valve 53 so that the valve 53 operates in the closing direction to exhibit a pressure reduction function in the gentle defrosting operation mode and may control the second pressure reducing valve 53 so that the valve 53 operates in the opening direction in the powerful defrosting operation mode compared to the gentle defrosting operation mode. Controlling the second pressure reducing valve 53 so that the valve 53 operates in the opening direction in the powerful defrosting operation mode cuts down the pressure loss caused by the refrigerant and allows a high-temperature, high-pressure refrigerant to flow toward the exterior heat exchanger 33 and melt the frost there. In addition, making the second pressure reducing valve 53 exhibit such a pressure reduction function in the gentle defrosting operation mode allows for performing a hot gas heating operation, thus achieving some heating capacity without using the exterior heat exchanger 33.

Furthermore, the air-conditioning controller 22 may control the blower 65 so that the volume of the air blown decreases during the defrosting operation compared to during the heating operation.

Furthermore, if the decision has been made that the air condition in the vehicle cabin is not good enough to meet the degree of heating requested detected by the degree-of-heating-requested detecting section 22b, the air-conditioning controller 22 may activate the PTC heater 67.

As can be seen from the foregoing description, if the quantity of heat absorbed by the exterior heat exchanger 33 has decreased, a vehicle air conditioner 1 according to this embodiment may switch the operation modes into a first hot gas heating operation mode in which the refrigerant discharged from the motor-driven compressor 30 is allowed to flow through the downstream and upstream interior heat exchangers 31 and 32, bypass the exterior heat exchanger 33, and then be sucked into the motor-driven compressor 30 after the pressure has been reduced or a second hot gas heating operation mode in which the refrigerant discharged from the motor-driven compressor 30 is allowed to flow through the downstream interior heat exchanger 31, bypass the upstream interior heat exchanger 32, further bypass the exterior heat exchanger 33, and then be sucked into the motor-driven compressor 30 after the pressure has been reduced. As a result, even if it is difficult to absorb heat using the exterior heat exchanger 33 when heating is requested, the vehicle cabin may be heated with the capacity adjusted according to the situation and with the dissipation of energy reduced.

In addition, the comfortableness in the vehicle cabin is increased by switching into the first hot gas heating operation mode if the degree of heating requested is high or into the second hot gas heating operation mode if the degree of heating requested is low.

Furthermore, by making a switch between the first and second hot gas heating operation modes in accordance with the quality of wet vapor of the refrigerant sucked into the motor-driven compressor 30, the reliability of the heat pump device 20 is increased with the motor-driven compressor 30 prevented from operating in a wet condition.

Furthermore, if the quantity of heat absorbed by the exterior heat exchanger 33 is even smaller, the refrigerant heater 35 may be activated to switch the modes into a hot gas heating operation mode. This thus ensures some heating capacity.

Moreover, a decrease in the quantity of heat absorbed by the exterior heat exchanger 33 may be detected by an outside air temperature sensor 70, thus allowing for detecting a decrease in the quantity of heat absorbed with reliability and at a low cost.

On top of that, a decrease in the quantity of heat absorbed by the exterior heat exchanger 33 is detected by the frosting detecting section 22a of the exterior heat exchanger 33. This allows for performing a control depending on the condition of the exterior heat exchanger 33.

Furthermore, the refrigerant heater 35 is implemented as an electric heater, thus allowing for providing comfortable air conditioning with a vehicle air conditioner 1 mounted on an electric vehicle.

Furthermore, the refrigerant heater 35 is prohibited from being activated if the charge level of the vehicle's traction battery B is low, thus allowing for increasing the distance to empty when the vehicle air conditioner is mounted on an electric vehicle.

Furthermore, if the traction battery B is being charged, the refrigerant heater 35 is activated, thus allowing for ensuring some heating capacity before the vehicle starts to travel and after the vehicle has traveled and increasing the occupant's comfortableness. In addition, when the vehicle air conditioner is mounted on an electric vehicle, the distance to empty is hardly affected.

Furthermore, the PTC heater 67 is activated if the decision has been made that the degree of heating requested will not be reached even by performing a hot gas heating mode of operation. This thus allows for increasing the occupant's comfortableness.

Furthermore, the operation modes are switched into a second hot gas heating operation mode at the beginning of heating, thus resulting in an increase in quickness of heating and an increase in the occupant's comfortableness.

Figure 17:
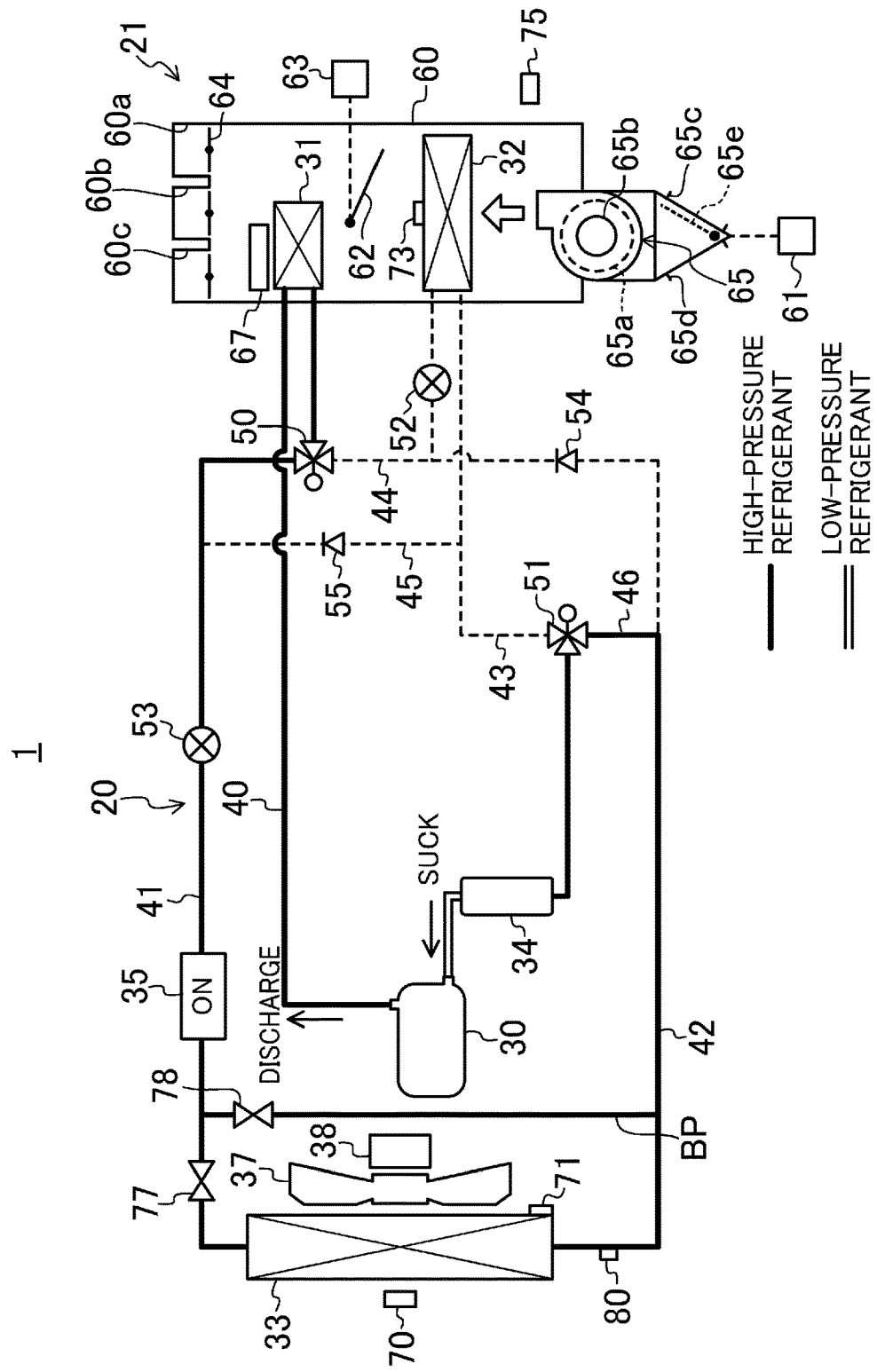
FIG. 17 illustrates a general configuration for a vehicle air conditioner as a variation.

In the embodiments described above, the bypass switching valve 56 of the heat pump device 20 is configured as a three-way valve. However, the bypass switching valve 56 may also be a combination of two on-off valves 77 and 78 as in the variation shown in FIG. 17 or any other means for switching the bypass pipe BP may be used instead.

Also, in the embodiments described above, the first and second flow path switching valves 50 and 51 of the heat pump device 20 are both configured as three-way valves. However, either or both of the valves 50 and 51 may be a combination of two on-off valves. Any flow path switching means may be used without particular limitation.

Also, in the embodiments described above, the vehicle air conditioner 1 is supposed to be mounted on an electric vehicle. However, this is only an example of the present invention. The vehicle air conditioner 1 may also be mounted on various other types of automobiles such as a hybrid car including an engine and a traction motor.

Note that each and every embodiment described above is just an example in any respects and should not be construed to be a limiting one. Besides, any variations or modifications falling within the range of equivalents to the claims to be described below are all encompassed within the scope of the present invention.

As can be seen from the foregoing description, a vehicle air conditioner according to the present invention may be mounted on electric vehicles and hybrid vehicles, for example.

The invention claimed is:
1. A vehicle air conditioner comprising:
a heat pump device including a compressor that compresses a refrigerant, a first interior heat exchanger provided inside a vehicle cabin, a second interior heat exchanger provided inside the vehicle cabin and upstream of the first interior heat exchanger in an airflow direction, an exterior heat exchanger provided outside the vehicle cabin, and a pressure reducing valve, the heat pump device being formed by connecting together the compressor, the first and second interior heat exchangers, the pressure reducing valve and the exterior heat exchanger via refrigerant piping, the heat pump device further including a bypass pipe through which the refrigerant is bypassed around the exterior heat exchanger, the heat pump device being switchable between multiple operation modes;
an interior air-conditioning unit which houses the first and second interior heat exchangers and which includes a blower that blows air-conditioning air to the first and second interior heat exchangers, the interior air-conditioning unit being configured to produce conditioned air and supply the conditioned air into the vehicle cabin; and
an air-conditioning controller configured to control the heat pump device and the interior air-conditioning unit, wherein
the air conditioner further includes
an exterior heat exchanger temperature sensor for determining whether or not the quantity of heat absorbed by the exterior heat exchanger has decreased during heating, and
a degree-of-heating-requested detecting section for detecting the degree of heating requested,
the heat pump device includes a plurality of valves for switching a refrigerant channel between
a first hot gas heating operation mode in which at least the refrigerant discharged from the compressor is allowed to flow through the first and second interior heat exchangers so that each of these interior heat exchangers functions as a radiator, be bypassed around the exterior heat exchanger with pressure reduced by the pressure reducing valve, and then be sucked into the compressor, and
a second hot gas heating operation mode in which the refrigerant discharged from the compressor is allowed to flow through the first interior heat exchanger, be bypassed around the second interior heat exchanger, be further bypassed around the exterior heat exchanger after pressure has been reduced by the pressure reducing valve, and then be sucked into the compressor,
if the exterior heat exchanger temperature sensor has sensed that the quantity of heat absorbed by the exterior heat exchanger is equal to or smaller than a first predetermined value, and the degree-of-heating-requested detecting section has found the degree of heating requested high, the air-conditioning controller switches the plurality of valves and makes the heat pump device operate in the first hot gas heating operation mode, and
if the exterior heat exchanger temperature sensor has sensed that the quantity of heat absorbed by the exterior heat exchanger is equal to or smaller than a first predetermined value, and the degree-of-heating-requested detecting section has found the degree of heating requested low, the air-conditioning controller switches the plurality of valves and makes the heat pump device operate in the second hot gas heating operation mode.

2. The vehicle air conditioner of claim 1, wherein in both the first hot gas heating operation mode and the second hot gas heating operation mode, the refrigerant of which the pressure has been reduced by the pressure reducing valve is sucked into the compressor without passing through the heat exchanger.

\* \* \* \* \*